US012701058B2

(12) United States Patent
Zhang et al.

(10) Patent No.: US 12,701,058 B2
(45) Date of Patent: Aug. 4, 2026

(54) INFORMATION PROCESSING METHOD, NETWORK DEVICE, STORAGE MEDIUM, AND PROGRAM PRODUCT

(71) Applicant: ZTE Corporation, Shenzhen (CN)

(72) Inventors: Zheng Zhang, Shenzhen (CN); Haidong Zhu, Shenzhen (CN); Qiang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 18/854,511

(22) PCT Filed: Jan. 19, 2023

(86) PCT No.: PCT/CN2023/073244
§ 371 (c)(1),
(2) Date: Oct. 4, 2024

(87) PCT Pub. No.: WO2023/231427
PCT Pub. Date: Dec. 7, 2023

(65) Prior Publication Data
US 2025/0247311 A1     Jul. 31, 2025

(30) Foreign Application Priority Data

May 31, 2022     (CN) .......................... 202210607018.2

(51) Int. Cl.
*G06F 15/16*          (2006.01)
*H04L 12/18*          (2006.01)
(Continued)

(52) U.S. Cl.
CPC ........ *H04L 43/026* (2013.01); *H04L 12/1863* (2013.01); *H04L 12/1886* (2013.01);
(Continued)

(58) Field of Classification Search
CPC ............... H04L 12/863; H04L 12/1886; H04L 12/4633; H04L 43/026; H04L 43/106;
(Continued)

(56) References Cited

U.S. PATENT DOCUMENTS 7,869,425 B2 *  1/2011  Elliott ................. H04L 12/1492
                                                          709/228
10,447,496 B2 *  10/2019  Wang ................... H04L 12/4633
(Continued)

FOREIGN PATENT DOCUMENTS

CN          113014486 A       6/2021
CN          113765809 A       12/2021
(Continued)

OTHER PUBLICATIONS

Extended European Search Report for European Application No. 23814626.0, dated Jun. 3, 2025.
(Continued)

*Primary Examiner* — Moustafa M Meky

(74) *Attorney, Agent, or Firm* — Wolf, Greenfield & Sacks, P.C.

(57) ABSTRACT
An information processing method, a network device, a storage medium, and a program product are disclosed. The information processing method may include: receiving a Bit Index Explicit Replication (BIER) flow flowing through a current node; and collecting statistics on the BIER flow to obtain node statistics information of the BIER flow.

20 Claims, 18 Drawing Sheets

Receive a BIER flow flowing through a current node ⟩ S100

Collect statistics on the BIER flow to obtain node statistics information of the BIER flow ⟩ S200

(51) Int. Cl.

| | |
|---|---|
| *H04L 12/46* | (2006.01) |
| *H04L 43/026* | (2022.01) |
| *H04L 43/0817* | (2022.01) |
| *H04L 43/106* | (2022.01) |
| *H04L 45/16* | (2022.01) |
| *H04L 45/50* | (2022.01) |
| *H04L 47/70* | (2022.01) |

(52) U.S. Cl.
CPC ...... *H04L 12/4633* (2013.01); *H04L 43/0817* (2013.01); *H04L 43/106* (2013.01); *H04L 45/16* (2013.01); *H04L 45/50* (2013.01); *H04L 47/822* (2013.01)

(58) Field of Classification Search
CPC ..... H04L 43/0817; H04L 45/16; H04L 45/50; H04L 47/822
USPC ......................................................... 709/224
See application file for complete search history.

(56) References Cited

U.S. PATENT DOCUMENTS

| | | | | |
|---|---|---|---|---|
| 10,726,009 | B2 * | 7/2020 | Pal ..................... | G06F 16/24554 |
| 10,985,942 | B2 * | 4/2021 | Wang .................. | H04L 12/4625 |
| 11,416,528 | B2 * | 8/2022 | Pal ..................... | G06F 16/24554 |
| 11,451,468 | B2 * | 9/2022 | Mishra .................... | H04L 45/16 |
| 11,632,354 | B2 * | 4/2023 | Venaas .................. | H04L 61/103 |
| | | | | 709/245 |
| 11,704,219 | B1 * | 7/2023 | Lerner .................. | G06F 11/327 |
| | | | | 714/57 |
| 11,829,236 | B2 * | 11/2023 | Bath .................... | G06F 11/0751 |
| 11,949,594 | B2 * | 4/2024 | Chen .................... | H04L 45/745 |
| 2022/0239585 | A1 * | 7/2022 | Mishra ............... | H04L 12/1854 |
| 2023/0040579 | A1 | 2/2023 | Peng | |
| 2023/0096867 | A1 | 3/2023 | Liu et al. | |
| 2023/0283558 | A1 * | 9/2023 | Chen ...................... | H04L 45/16 |
| | | | | 370/236 |
| 2024/0146642 | A1 * | 5/2024 | Chen ...................... | H04L 45/16 |

FOREIGN PATENT DOCUMENTS

| | | |
|---|---|---|
| CN | 114338482 A | 4/2022 |
| EP | 2 899 933 A1 | 7/2015 |
| WO | WO 2021/254454 A1 | 12/2021 |

OTHER PUBLICATIONS

Office Action for Japanese Application No. 2024-558062, mailed Jun. 17, 2025.
International Search Report and Written Opinion for International Application No. PCT/CN2023/073244, mailed May 14, 2023.

\* cited by examiner

Determine a target BIER flow to be counted from the received BIER flow according to packet information of the BIER flow and a preset statistical rule, to collect statistics on the target BIER flow

S400

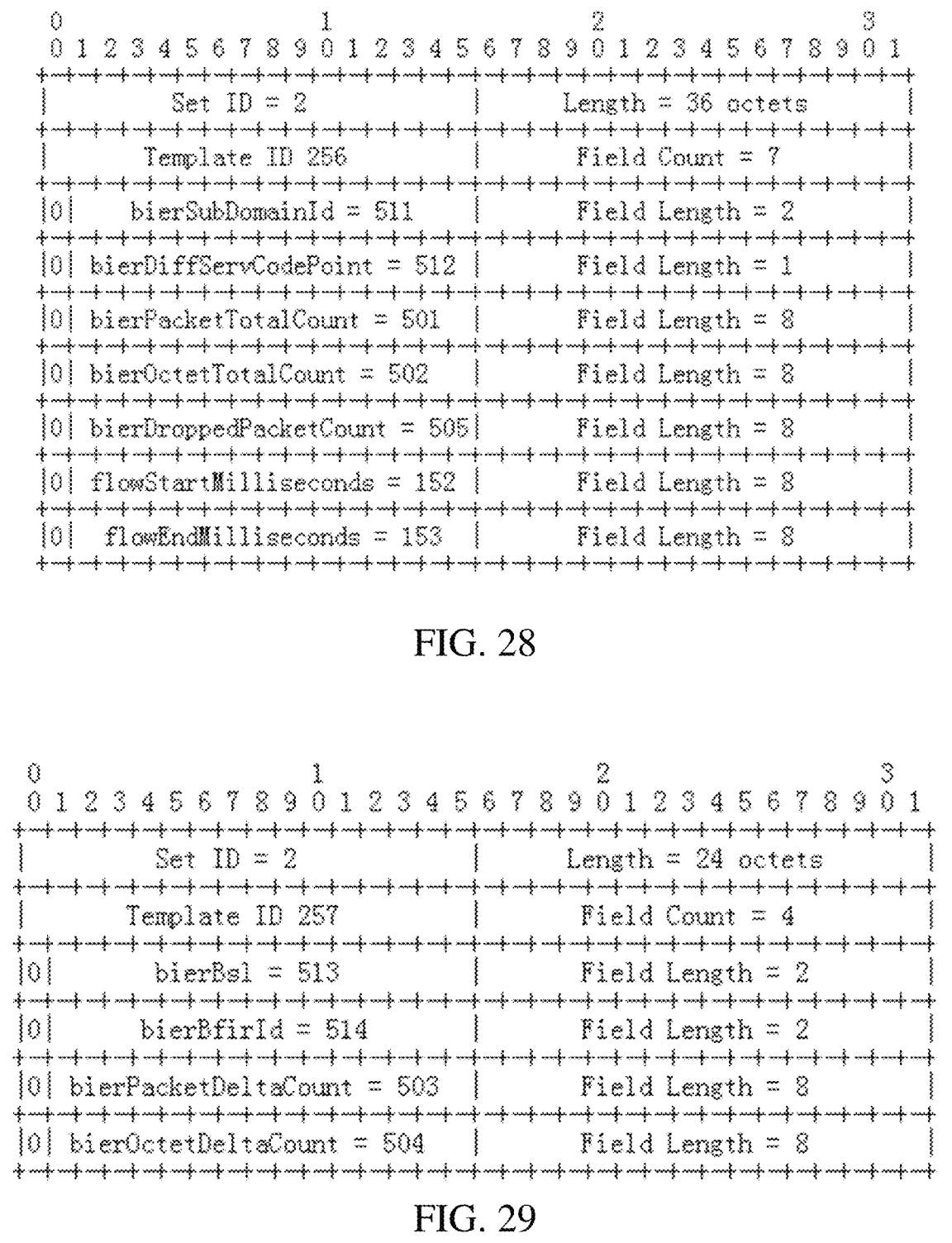

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |          Set ID = 2           |       Length = 36 octets      |
    +-+-+-+-+-+-+-+-+-+-+-+-+-+-+-+-+-+-+-+-+-+-+-+-+-+-+-+-+-+-+-+-+
    |        Template ID 256        |        Field Count = 7        |
    +-+-+-+-+-+-+-+-+-+-+-+-+-+-+-+-+-+-+-+-+-+-+-+-+-+-+-+-+-+-+-+-+
    |0|     bierSubDomainId = 511    |       Field Length = 2        |
    +-+-+-+-+-+-+-+-+-+-+-+-+-+-+-+-+-+-+-+-+-+-+-+-+-+-+-+-+-+-+-+-+
    |0| bierDiffServCodePoint = 512  |       Field Length = 1        |
    +-+-+-+-+-+-+-+-+-+-+-+-+-+-+-+-+-+-+-+-+-+-+-+-+-+-+-+-+-+-+-+-+
    |0| bierPacketTotalCount = 501   |       Field Length = 8        |
    +-+-+-+-+-+-+-+-+-+-+-+-+-+-+-+-+-+-+-+-+-+-+-+-+-+-+-+-+-+-+-+-+
    |0| bierOctetTotalCount = 502    |       Field Length = 8        |
    +-+-+-+-+-+-+-+-+-+-+-+-+-+-+-+-+-+-+-+-+-+-+-+-+-+-+-+-+-+-+-+-+
    |0| bierDroppedPacketCount = 505 |       Field Length = 8        |
    +-+-+-+-+-+-+-+-+-+-+-+-+-+-+-+-+-+-+-+-+-+-+-+-+-+-+-+-+-+-+-+-+
    |0| flowStartMilliseconds = 152  |       Field Length = 8        |
    +-+-+-+-+-+-+-+-+-+-+-+-+-+-+-+-+-+-+-+-+-+-+-+-+-+-+-+-+-+-+-+-+
    |0|  flowEndMilliseconds = 153   |       Field Length = 8        |
    +-+-+-+-+-+-+-+-+-+-+-+-+-+-+-+-+-+-+-+-+-+-+-+-+-+-+-+-+-+-+-+-+
```

FIG. 28

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |          Set ID = 2           |       Length = 24 octets      |
    +-+-+-+-+-+-+-+-+-+-+-+-+-+-+-+-+-+-+-+-+-+-+-+-+-+-+-+-+-+-+-+-+
    |        Template ID 257        |        Field Count = 4        |
    +-+-+-+-+-+-+-+-+-+-+-+-+-+-+-+-+-+-+-+-+-+-+-+-+-+-+-+-+-+-+-+-+
    |0|        bierBsl = 513         |       Field Length = 2        |
    +-+-+-+-+-+-+-+-+-+-+-+-+-+-+-+-+-+-+-+-+-+-+-+-+-+-+-+-+-+-+-+-+
    |0|       bierBfirId = 514       |       Field Length = 2        |
    +-+-+-+-+-+-+-+-+-+-+-+-+-+-+-+-+-+-+-+-+-+-+-+-+-+-+-+-+-+-+-+-+
    |0| bierPacketDeltaCount = 503   |       Field Length = 8        |
    +-+-+-+-+-+-+-+-+-+-+-+-+-+-+-+-+-+-+-+-+-+-+-+-+-+-+-+-+-+-+-+-+
    |0| bierOctetDeltaCount = 504    |       Field Length = 8        |
    +-+-+-+-+-+-+-+-+-+-+-+-+-+-+-+-+-+-+-+-+-+-+-+-+-+-+-+-+-+-+-+-+
```

FIG. 29

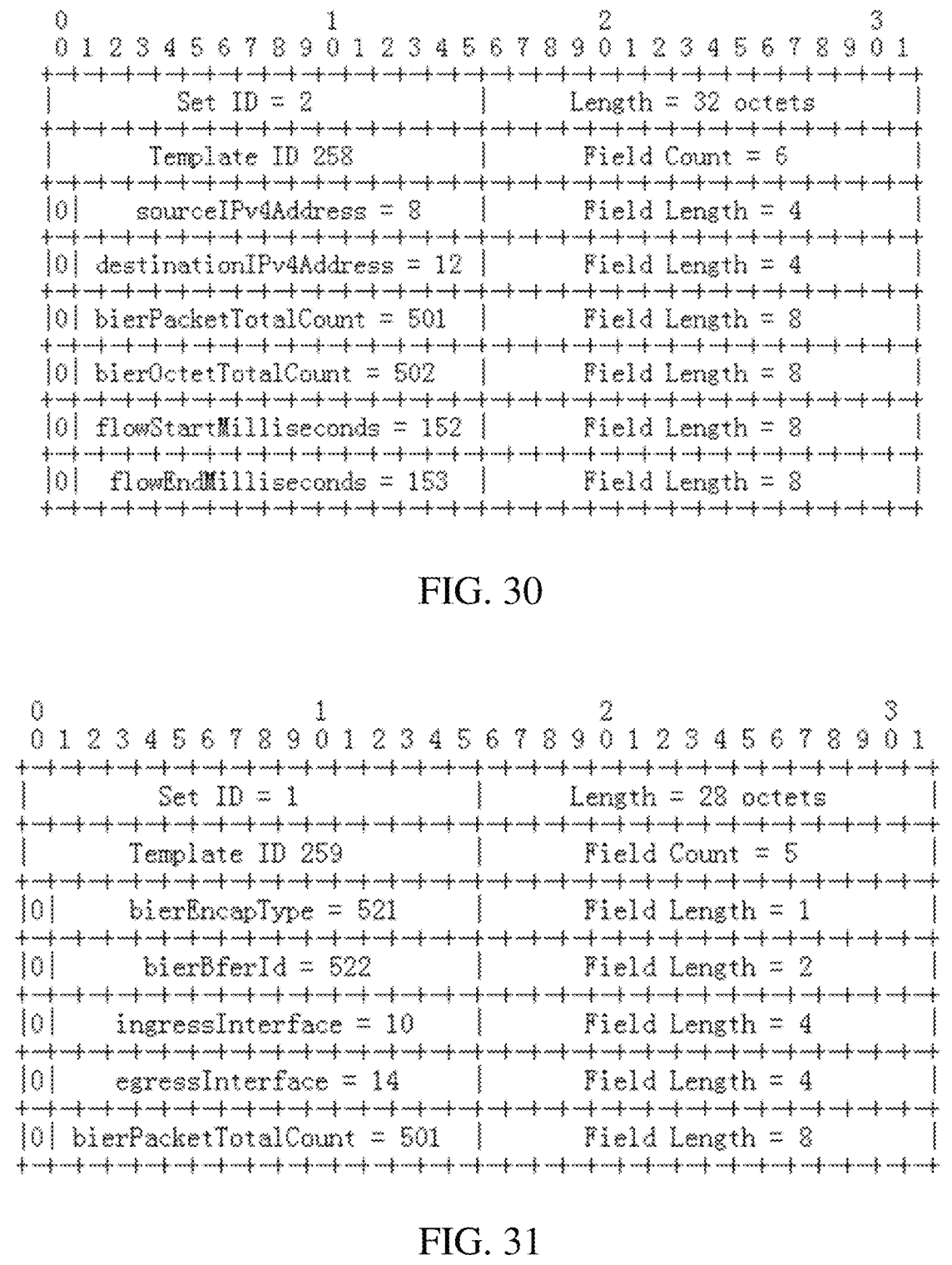

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Set ID = 2             |       Length = 32 octets       |
+-+-+-+-+-+-+-+-+-+-+-+-+-+-+-+-+-+-+-+-+-+-+-+-+-+-+-+-+-+-+-+-+
|          Template ID 258          |        Field Count = 6         |
+-+-+-+-+-+-+-+-+-+-+-+-+-+-+-+-+-+-+-+-+-+-+-+-+-+-+-+-+-+-+-+-+
|0|     sourceIPv4Address = 8        |       Field Length = 4         |
+-+-+-+-+-+-+-+-+-+-+-+-+-+-+-+-+-+-+-+-+-+-+-+-+-+-+-+-+-+-+-+-+
|0|  destinationIPv4Address = 12     |       Field Length = 4         |
+-+-+-+-+-+-+-+-+-+-+-+-+-+-+-+-+-+-+-+-+-+-+-+-+-+-+-+-+-+-+-+-+
|0| bierPacketTotalCount = 501       |       Field Length = 8         |
+-+-+-+-+-+-+-+-+-+-+-+-+-+-+-+-+-+-+-+-+-+-+-+-+-+-+-+-+-+-+-+-+
|0| bierOctetTotalCount = 502        |       Field Length = 8         |
+-+-+-+-+-+-+-+-+-+-+-+-+-+-+-+-+-+-+-+-+-+-+-+-+-+-+-+-+-+-+-+-+
|0| flowStartMilliseconds = 152      |       Field Length = 8         |
+-+-+-+-+-+-+-+-+-+-+-+-+-+-+-+-+-+-+-+-+-+-+-+-+-+-+-+-+-+-+-+-+
|0|  flowEndMilliseconds = 153       |       Field Length = 8         |
+-+-+-+-+-+-+-+-+-+-+-+-+-+-+-+-+-+-+-+-+-+-+-+-+-+-+-+-+-+-+-+-+
```

FIG. 30

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Set ID = 1             |       Length = 28 octets       |
+-+-+-+-+-+-+-+-+-+-+-+-+-+-+-+-+-+-+-+-+-+-+-+-+-+-+-+-+-+-+-+-+
|          Template ID 259          |        Field Count = 5         |
+-+-+-+-+-+-+-+-+-+-+-+-+-+-+-+-+-+-+-+-+-+-+-+-+-+-+-+-+-+-+-+-+
|0|     bierEncapType = 521          |       Field Length = 1         |
+-+-+-+-+-+-+-+-+-+-+-+-+-+-+-+-+-+-+-+-+-+-+-+-+-+-+-+-+-+-+-+-+
|0|      bierBferId = 522            |       Field Length = 2         |
+-+-+-+-+-+-+-+-+-+-+-+-+-+-+-+-+-+-+-+-+-+-+-+-+-+-+-+-+-+-+-+-+
|0|    ingressInterface = 10         |       Field Length = 4         |
+-+-+-+-+-+-+-+-+-+-+-+-+-+-+-+-+-+-+-+-+-+-+-+-+-+-+-+-+-+-+-+-+
|0|     egressInterface = 14         |       Field Length = 4         |
+-+-+-+-+-+-+-+-+-+-+-+-+-+-+-+-+-+-+-+-+-+-+-+-+-+-+-+-+-+-+-+-+
|0| bierPacketTotalCount = 501       |       Field Length = 8         |
+-+-+-+-+-+-+-+-+-+-+-+-+-+-+-+-+-+-+-+-+-+-+-+-+-+-+-+-+-+-+-+-+
```

FIG. 31

INFORMATION PROCESSING METHOD, NETWORK DEVICE, STORAGE MEDIUM, AND PROGRAM PRODUCT

CROSS-REFERENCE TO RELATED APPLICATION

This application is a national stage filing under 35 U.S.C. § 371 of international application number PCT/CN2023/073244, filed Jan. 19, 2023, which claims priority to Chinese patent application No. 202210607018.2 filed May 31, 2022. The contents of these applications are incorporated herein by reference in their entirety.

TECHNICAL FIELD

The present disclosure relates to the technical field of communication, and more particularly, to an information processing method, a network device, a storage medium, and a program product.

BACKGROUND

Bit Index Explicit Replication (BIER) is a novel multicast technology. This technology neither requires explicit establishment of a multicast distribution tree, nor requires an intermediate network node to save any multicast flow state. According to the BIER technology, each network node at the edge of the network is represented by only one bit. A multicast flow transmitted in the intermediate network is additionally encapsulated with a specific BIER header, which marks all destination network nodes, known as BIT-Forwarding Egress Routers (BFERs), of the multicast flow in the form of a bit string. The intermediate network nodes route the multicast flow according to the bits to ensure that traffic can be sent to all the destination network nodes.

However, no method has been proposed collecting information of BIER flows has been proposed yet. As a result, network administrators are unable to monitor the status of BIER traffic within the network, and therefore cannot assess the traffic quality and identify potential abnormalities in the network.

SUMMARY

Embodiments of the present disclosure provide an information processing method, a network device, a storage medium, and a program product, which can realize the collection of BIER flows, to facilitate the statistics of traffic engineering-related information and the discovery of abnormal situations that may exist in a network.

In accordance with a first aspect of the present disclosure, an embodiment provides an information processing method, including: receiving a BIER flow flowing through a current node; and collecting statistics on the BIER flow to obtain node statistics information of the BIER flow.

In accordance with a second aspect of the present disclosure, an embodiment provides an information processing method, including: acquiring node statistics information of a BIER flow and encoding information corresponding to the node statistics information; and determining a current network state according to the node statistics information and the encoding information.

In accordance with a third aspect of the present disclosure, an embodiment provides a network device, including: a memory, a processor, and a computer program stored in the memory and executable by the processor, the computer program, when executed by the processor, causes the processor to perform the information processing method described above.

In accordance with a fourth aspect of the present disclosure, an embodiment provides a computer-readable storage medium storing computer-executable instructions which, when executed by a processor, cause the processor to perform the information processing method described above.

In accordance with a fifth aspect of the present disclosure, an embodiment provides a computer program product, including a computer program or computer instructions stored in a computer-readable storage medium, the computer program or computer instructions, when read from the computer-readable storage medium and executed by a processor of a computer device, causes the computer device to perform the information processing method described above.

In the embodiments of the present disclosure, statistics on a BIER flow flowing through a current node can be collected, to obtain node statistics information of the BIER flow, thereby realizing collection of the BIER flow. Therefore, based on the collected BIER flow, the embodiments of the present disclosure can facilitate subsequent statistics of traffic engineering-related information and discovery of abnormal situations that may exist in a network.

BRIEF DESCRIPTION OF DRAWINGS

FIG. 28 is a schematic diagram of a template and data for a specific BIER SD and a DSCP value of 6 according to an embodiment of the present disclosure;

FIG. 29 is a schematic diagram of a template and data for a specific BFIR device and a BSL of 256 according to an embodiment of the present disclosure;

FIG. 30 is a schematic diagram of a template and data for a specific multicast flow according to an embodiment of the present disclosure;

FIG. 31 is a schematic diagram of a template and data for a specific BFER device and a specific BIER encapsulation type according to an embodiment of the present disclosure;

DETAILED DESCRIPTION

Figure 1:
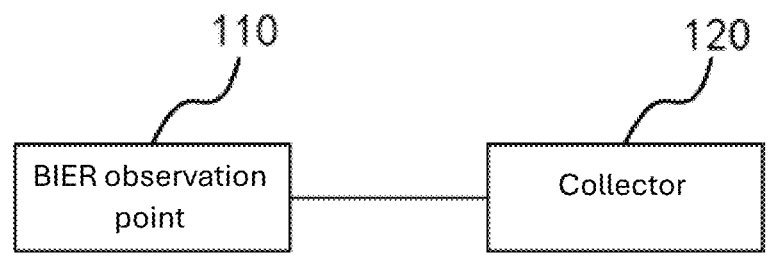
FIG. 1 is a schematic diagram of an implementation environment configured for executing an information processing method according to an embodiment of the present disclosure.

To make the purposes, technical schemes, and advantages of the present disclosure clear, further details are provided in conjunction with the accompanying drawings and examples. It should be understood that the specific embodiments described herein are provided solely for illustrative purposes, and are not intended to limit the scope of the present disclosure.

Additionally, although logical orders have been shown in the flowcharts, in some cases, the steps shown or described may be executed in an order different from the orders as shown in the flowcharts. The terms such as "first", "second" and the like in the description, the claims, and the accompanying drawings are used to distinguish similar purposes, and are not necessarily used to indicate a specific order or precedence.

BIER (RFC 8279) is a novel multicast data forwarding technology, in which each node at the edge of the network is represented by only one bit. A multicast flow transmitted in the intermediate network is additionally encapsulated with a specific BIER header, which marks all destination nodes, i.e., BFERs, of the multicast flow in the form of a bit string. The intermediate network nodes route the multicast flow according to the bits to ensure that the multicast flow can be sent to all the destination nodes.

To transmit a multicast flow, an ingress device BFIR of a BIER domain needs to know which egress devices BFERs in the BIER domain need this multicast flow. A BIER Overlay technology is used between the BFIR and the BFERs to exchange multicast flow statuses. An intermediate Bit-Forwarding Router (BFR) device that is only used for BIER forwarding does not need to know information about this multicast flow.

To construct BIER forwarding entries, BIER underlay protocols such as Open Shortest Path First (OSPF) or Intermediate System-to-Intermediate System (ISIS) support the advertising of BIER information through signaling extension and the construction of BIER forwarding entries according to the BIER information.

IP Flow Information eXport (IPFIX) RFC 5470 is a network traffic monitoring protocol. No method for collecting information of BIER flows has been proposed in this protocol yet, so the statistics and collection of BIER flows cannot be performed. In addition, RFC 8296 defines the structure of a BIER packet header and specifies and defines the fields in the BIER packet header. However, devices in the network cannot correctly classify, filter, and collect statistics on BIER packets directly according to the packet headers.

Therefore, the present disclosure provides an information processing method, a network device, a storage medium, and a program product. According to an embodiment, the information processing method includes: receiving a BIER flow flowing through a current node; and collecting statistics on the BIER flow to obtain node statistics information of the BIER flow. In other words, in the present disclosure, statistics on a BIER flow flowing through a current node can be collected, to obtain node statistics information of the BIER flow, thereby realizing collection of the BIER flow. Therefore, based on the collected BIER flow, the present disclosure can facilitate subsequent statistics of traffic engineering-related information and discovery of abnormal situations that may exist in a network.

The embodiments of the present disclosure will be further described in detail below in conjunction with the accompanying drawings.

FIG. 1 is a schematic diagram of an implementation environment configured for executing an information processing method according to an embodiment of the present disclosure.

In an example of FIG. 1, the implementation environment includes, but not limited to, a BIER observation point 110 and a collector 120. The BIER observation point 110 is in communication connection with the collector 120.

In an implementation, the relative positions, numbers, etc., of the BIER observation point 110 and the collector 120 may be set according to specific application scenarios. For example, the BIER observation point 110 may include at least one of a BFIR, a BFER, or an intermediate BFR.

Figure 2:
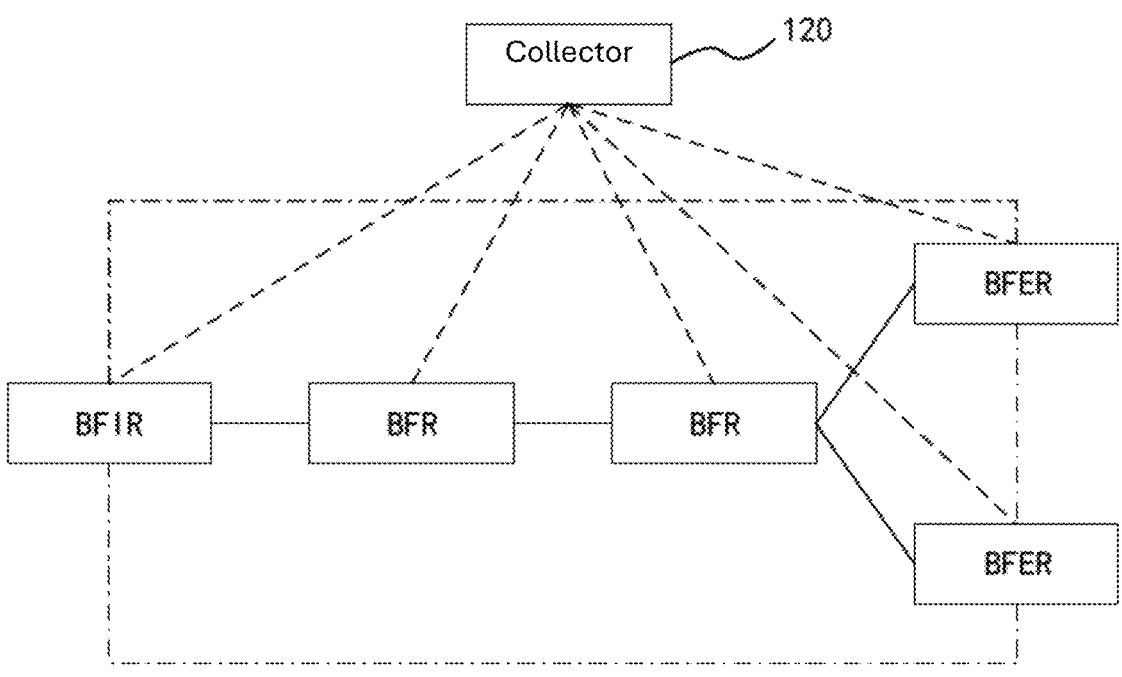
FIG. 2 is a schematic diagram of an implementation environment configured for executing an information processing method according to another embodiment of the present disclosure.

The BIER observation point 110 may be deployed on one or more devices. As shown in FIG. 2, in a BIER observation domain, BIER observation points 110 may include a BFIR, BFERs, and intermediate BFRs, and the collector 120 is respectively in communication connection with the BFIR, the BFERs, and the intermediate BFRs.

In the implementation environments in FIG. 1 and FIG. 2, the BIER observation point 110 may only have a BIER flow collection function, i.e., the BIER observation point 110 is only responsible for collecting BIER flows. In addition, subsequent information analysis of the collected BIER flows may be centrally performed by the collector 120.

Based on FIG. 1 to FIG. 2, in an implementation, the BIER observation point 110 may be a router or switch device, an interface on a router or switch, or a line board including a group of interfaces. The router or switch device may directly perform traffic statistics and measurement. Alternatively, the router or switch device sends traffic to other routers or switch devices having a measurement function or a server having a measurement function, and these devices perform a measurement statistics function and send statistics information to the collector 120. This is not particularly limited in this embodiment.

Figure 3:
FIG. 3 is a schematic diagram of an implementation environment configured for executing an information processing method according to another embodiment of the present disclosure.

In an example of FIG. 3, the implementation environment may include, but not limited to, a BIER observation point 110.

In an implementation, the position, number, etc., of the BIER observation point 110 may be set according to specific application scenarios. For example, the BIER observation point 110 may include at least one of a BFIR, a BFER, or an intermediate BFR.

In the implementation environment in FIG. 3, the BIER observation point 110 may have both a BIER flow collection function and a BIER flow analysis function, i.e., after collecting BIER flows, the BIER observation point 110 also performs subsequent information analysis of the collected BIER flows.

For FIG. 3, in an implementation, the BIER observation point 110 may be a router or switch device, an interface on a router or switch, or a line board including a group of interfaces. The router or switch device may directly perform traffic statistics, measurement, and analysis. This is not particularly limited in this embodiment.

It can be understood by those having ordinary skills in the art that the implementation environment for executing the information processing method may be applied to a 3rd Generation (3G) communication network system, a Long Term Evolution (LTE) communication network system, a 5th Generation (5G) communication network system, a 6th Generation (6G) communication network system, future evolved mobile/fixed communication network systems, etc., which is not particularly limited in this embodiment.

Those having ordinary skills in the art may understand that the implementation environments shown in FIG. 1 to FIG. 3 do not constitute a limitation to the embodiments of the present disclosure, and more or fewer components than those shown in the figure may be included, or some components may be combined, or a different component arrangement may be used.

Based on the above implementation environment, various embodiments of the information processing method of the present disclosure are proposed below.

Figure 4:
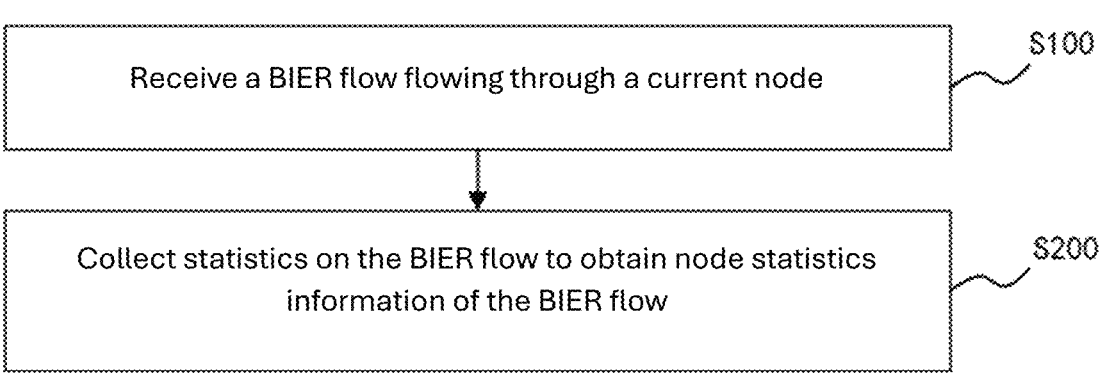
FIG. 4 is a flowchart of an information processing method according to an embodiment of the present disclosure.

FIG. 4 is a flowchart of an information processing method according to an embodiment of the present disclosure. The information processing method may be applied to the BIER observation point in FIG. 1 to FIG. 3, and may include, but not limited to, the following steps S100 to S200.

At S100, a BIER flow flowing through a current node is received.

At S200, statistics on the BIER flow are collected to obtain node statistics information of the BIER flow.

The BIER observation point receives a BIER flow flowing therethrough, and then collects statistics on the BIER flow, to obtain node statistics information of the BIER flow.

In an embodiment, the node statistics information may include at least one of: a number of received packets of the BIER flow, a number of received bytes of the BIER flow, an egress interface for sending the BIER flow, a number of sent packets of the BIER flow, a number of sent bytes of the BIER flow, a number of dropped packets of the BIER flow, a number of dropped bytes of the BIER flow, a timestamp at which the BIER flow arrives at the current node, and a timestamp at which the BIER flow leaves the current node.

According to the embodiment of the present disclosure, statistics on a BIER flow flowing through a current node can be collected, to obtain node statistics information of the BIER flow, thereby realizing collection of the BIER flow. Therefore, based on the collected BIER flow, the embodiment of the present disclosure can facilitate subsequent statistics of traffic engineering-related information and discovery of abnormal situations that may exist in a network.

Figure 5:
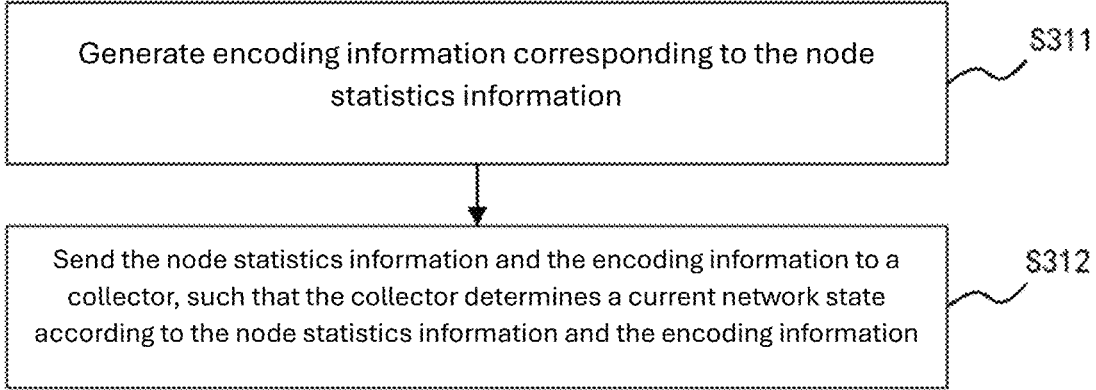
FIG. 5 is a flowchart of analysis and processing by a collector in an information processing method according to an embodiment of the present disclosure.

FIG. 5 is a flowchart of analysis and processing by a collector in an information processing method according to an embodiment of the present disclosure. After S200, the information processing method may further include, but not limited to, the following steps S311 and S312.

At S311, encoding information corresponding to the node statistics information is generated.

At S312, the node statistics information and the encoding information are sent to a collector, such that the collector determines a current network state according to the node statistics information and the encoding information.

In a case where analysis and processing are performed by a collector, when sending the node statistics information, the BIER observation point carries encoding information of relevant data, for the collector to decode. The encoding information includes two parts: a template and data. In addition to one or more elements such as the number of received packets or bytes of the BIER flow, the egress interface for sending the BIER flow, the number of sent packets or bytes of the BIER flow, the number of dropped packets or bytes of the BIER flow, a timestamp at which the BIER flow arrives at the device, and a timestamp at which the BIER flow leaves the device, the template may also include one or more limiting elements such as a BSL, an ingress BFIR device ID, a specified TC/DSCP, a specified BIER SD, a specified egress BFER device, and a specified multicast flow.

The collector may obtain a transmission delay of BIER flow in the network as a traffic engineering parameter according to timestamp information in the node statistics information. Alternatively, the collector may compare traffic entering the BIER domain with traffic exiting the BIER domain to determine whether there is spoof or attack traffic in the network.

Figure 6:
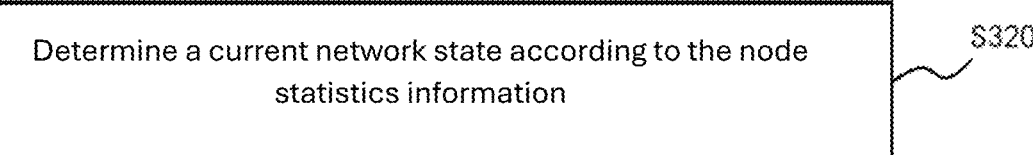
FIG. 6 is a flowchart of analysis and processing by a BIER observation point in an information processing method according to an embodiment of the present disclosure.

FIG. 6 is a flowchart of analysis and processing by a BIER observation point in an information processing method according to an embodiment of the present disclosure. After S200, the information processing method may further include, but not limited to, a following operation S320.

At S320, a current network state is determined according to the node statistics information.

In a case where analysis and processing are performed by the BIER observation point, the BIER observation point determines the current network state according to the node statistics information after obtaining the node statistics information. For example, the BIER observation point may obtain a transmission delay of BIER flow in the network as a traffic engineering parameter according to timestamp information in the node statistics information. Alternatively, the BIER observation point may compare traffic entering the BIER domain with traffic exiting the BIER domain to determine whether there is spoof or attack traffic in the network.

Figures 7, 8:
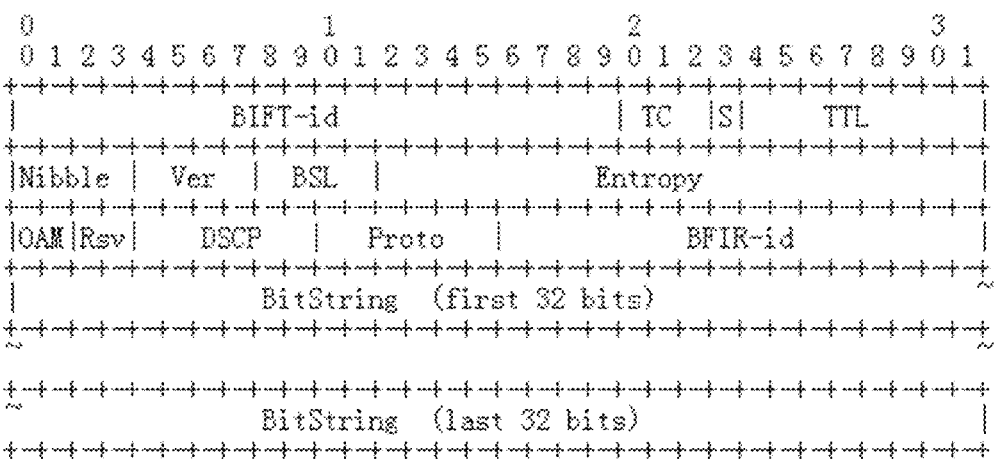
FIG. 7 is a flowchart of classification according to a preset statistical rule in an information processing method according to an embodiment of the present disclosure.
FIG. 8 is a schematic diagram of a format of a BIER header according to an embodiment of the present disclosure.

FIG. 7 is a flowchart of classification according to a preset statistical rule in an information processing method according to an embodiment of the present disclosure. After S100, the information processing method may further include, but not limited to, a following step S400.

At S400, a target BIER flow to be counted is determined from the received BIER flow according to packet information of the BIER flow and a preset statistical rule, to collect statistics on the target BIER flow.

Figure 9:
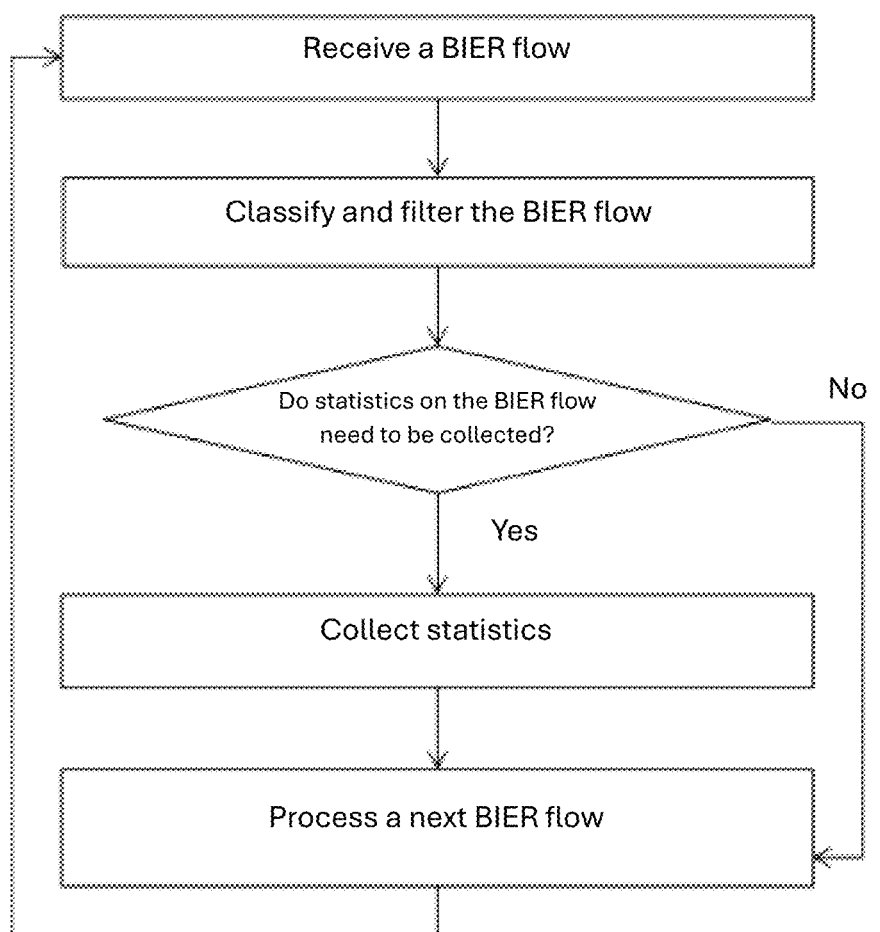
FIG. 9 is a flowchart of processing and collecting statistics on a BIER flow according to an embodiment of the present disclosure.

In order to realize the statistics of the BIER flow, the BIER observation points need to identify, classify and perform necessary filtering on the BIER flow before collecting statistics. TC/DSCP, BSL, BFIR-ID, BitString, etc., mentioned below are all as defined in the BIER header format specified in RFC 8296, as shown in FIG. 8. In addition, a process of processing and collecting statistics on the BIER flow is shown in FIG. 9.

In an embodiment, the BIER observation point may collect statistics on only part of the BIER flow according to the preset statistical rule. The preset statistical rule may be configured by a network administrator or advertised to the observation point by a controller through YANG model extension, Border Gateway Protocol-Link State (BGP-LS) extension, or other means as required. In other words, the preset statistical rule may be obtained by the current node by, for example, but not limited to, any one of the following manners that: the preset statistical rule is obtained according to configuration information of the current node, the preset statistical rule is obtained by extending a YANG model to the current node, or the preset statistical rule is obtained by extending a BGP-LS to the current node.

In an embodiment, the preset statistical rule may be based on any one of the following elements: encapsulation type information, BSL information, SD information, TC information, DSCP information, BFIR device identity information, BFER device identity information, a preset traffic element, a source address, a destination address, a source port number, and a destination port number.

The preset statistical rule may be based on a single element or a combination of a plurality of elements. In the embodiments of the present disclosure, a single element or some element combinations are described by way of example only, and the present disclosure is not limited thereto.

For the statistical method of the preset statistical rule, some elements are described by way of example below.

Figure 10:
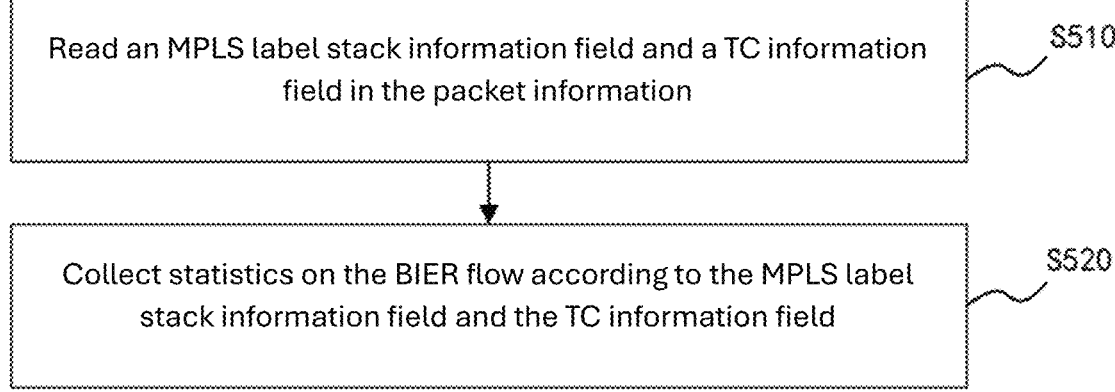
FIG. 10 is a detailed flowchart of S400 in the case of Multiprotocol Label Switching (MPLS) encapsulation and using a preset statistical rule based on Traffic Class (TC) information in an information processing method according to an embodiment of the present disclosure.

FIG. 10 is a detailed flowchart of S400 in the case of MPLS encapsulation and using a preset statistical rule based on TC information in an information processing method according to an embodiment of the present disclosure. S400 may include, but not limited to, the following steps S510 and S520.

At S510, an MPLS label stack information field and a TC information field in the packet information are read.

At S520, statistics on the BIER flow are collected according to the MPLS label stack information field and the TC information field.

In an embodiment, in a case where the preset statistical rule is based on TC information, statistics on BIER flows whose TC field is set to 2 need to be collected. In this case, it is necessary to filter the BIER flows to collect statistics on only flows that are based on MPLS encapsulation and whose TC field is set to 2.

In the embodiment of the present disclosure, when statistics are required, the MPLS label stack information field and the TC information fields in the packet information are read, and then it is determined according to data in the MPLS label stack information field and the TC information field whether statistics on the BIER flow need to be collected.

Figure 11:
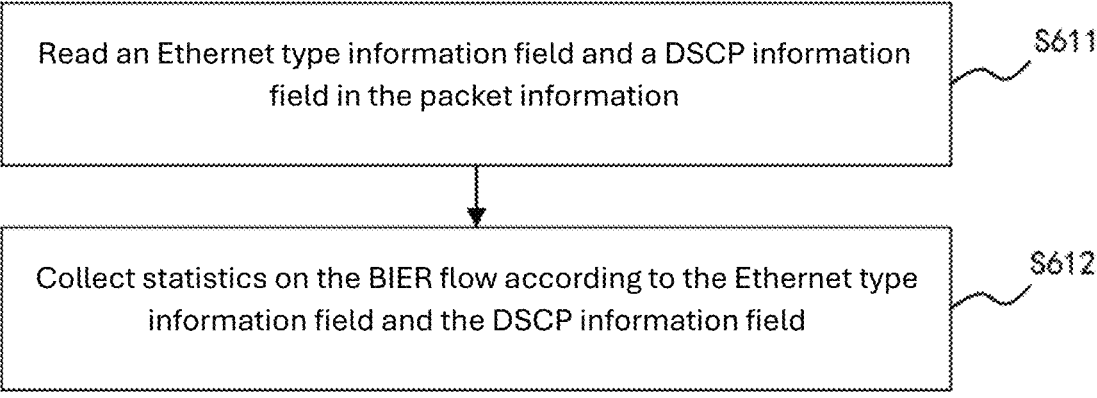
FIG. 11 is a detailed flowchart of S400 in the case of Ethernet type encapsulation and using a preset statistical rule based on Differentiated Services Code Point (DSCP) information in an information processing method according to an embodiment of the present disclosure.

FIG. 11 is a detailed flowchart of S400 in the case of Ethernet type encapsulation and using a preset statistical rule based on DSCP information in an information processing method according to an embodiment of the present disclosure. S400 may include, but not limited to, the following steps S611 and S612.

At S611, an Ethernet type information field and a DSCP information field in the packet information are read.

At S612, statistics on the BIER flow are collected according to the Ethernet type information field and the DSCP information field.

In an embodiment, in a case where the preset statistical rule is based on DSCP information, statistics on BIER flows whose DSCP field is set to 6 need to be collected. In this case, it is necessary to collect statistics on BIER flows which are based on Ethernet encapsulation and IPv6 encapsulation and whose DSCP field is set to 6.

When statistics on the BIER flow based on Ethernet encapsulation are collected, the Ethernet type information field and the DSCP information field in the packet information may be read, and then it is determined according to data in the Ethernet type information field and the DSCP information field whether statistics on the BIER flow need to be collected.

Figure 12:
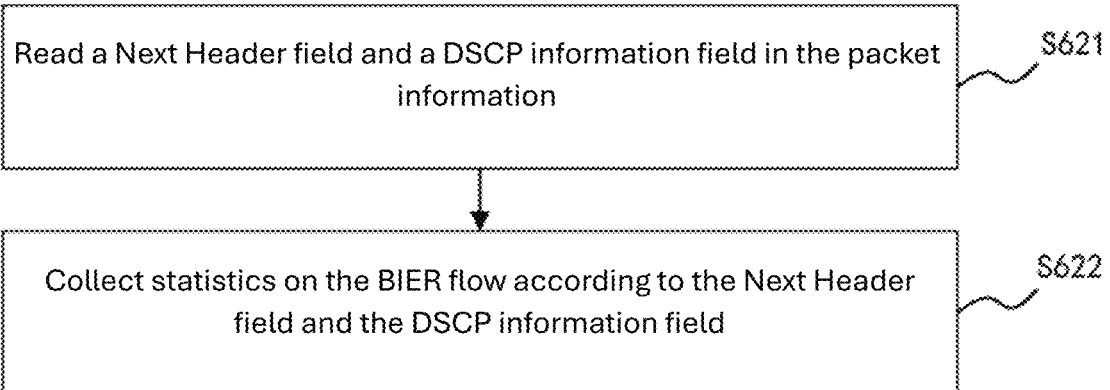
FIG. 12 is a detailed flowchart of S400 in the case of IPV6 encapsulation and using a preset statistical rule based on DSCP information in an information processing method according to an embodiment of the present disclosure.

FIG. 12 is a detailed flowchart of S400 in the case of IPV6 encapsulation and using a preset statistical rule based on DSCP information in an information processing method according to an embodiment of the present disclosure. S400 may include, but not limited to, the following steps S621 and S622.

At S621, a Next Header field and a DSCP information field in the packet information are read.

At S622, statistics on the BIER flow are collected according to the Next Header field and the DSCP information field.

In an embodiment, in a case where the preset statistical rule is based on DSCP information, statistics on BIER flows whose DSCP field is set to 6 need to be collected. In this case, it is necessary to collect statistics on BIER flows which are based on Ethernet encapsulation and IPv6 encapsulation and whose DSCP field is set to 6.

When statistics on the BIER flow based on IPV6 encapsulation are collected, the BIER flow based on IPv6 encapsulation includes a variety of cases. For the flow whose IPV6 Next Header is set to a BIER type, in the embodiment of the present disclosure, the Next Header field and the DSCP information field in the packet information are read, and then it is determined according to data in the Next Header field and the DSCP information field whether statistics on the BIER flow need to be collected.

Figure 13:
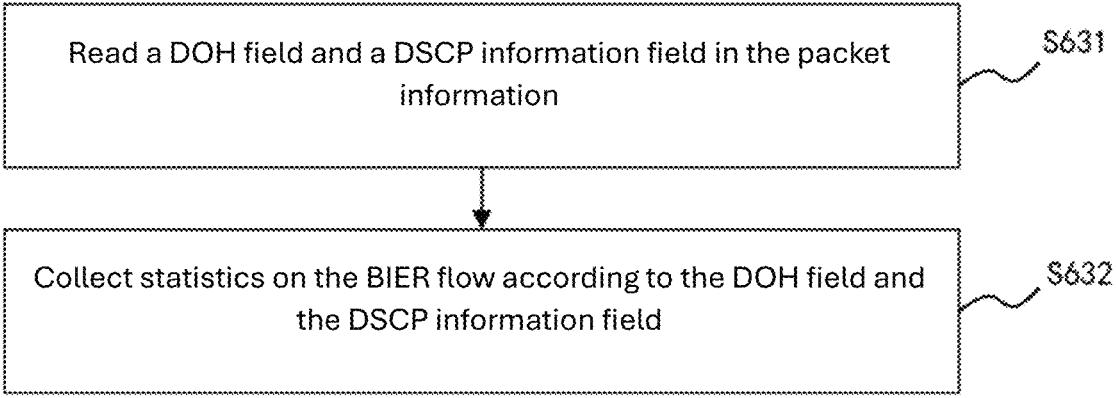
FIG. 13 is a detailed flowchart of S400 in the case of IPV6 encapsulation and using a preset statistical rule based on DSCP information in an information processing method according to another embodiment of the present disclosure.

FIG. 13 is a detailed flowchart of S400 in the case of IPV6 encapsulation and using a preset statistical rule based on DSCP information in an information processing method according to another embodiment of the present disclosure. S400 may include, but not limited to, the following steps S631 and S632.

At S631, a Destination Options Header (DOH) field and a DSCP information field in the packet information are read.

At S632, statistics on the BIER flow are collected according to the DOH field and the DSCP information field.

In an embodiment, in a case where the preset statistical rule is based on DSCP information, statistics on BIER flows whose DSCP field is set to 6 need to be collected. In this case, it is necessary to collect statistics on BIER flows which are based on Ethernet encapsulation and IPv6 encapsulation and whose DSCP field is set to 6.

When statistics on the BIER flow based on IPV6 encapsulation are collected, the BIER flow based on IPv6 encapsulation includes a variety of cases. For the flow whose IPV6 Next Header is set to 60, i.e., DOH containing a BIER type option, in the embodiment of the present disclosure, the DOH field and the DSCP information field in the packet information are read, and then it is determined according to data in the DOH field and the DSCP information field whether statistics on the BIER flow need to be collected.

Figure 14:
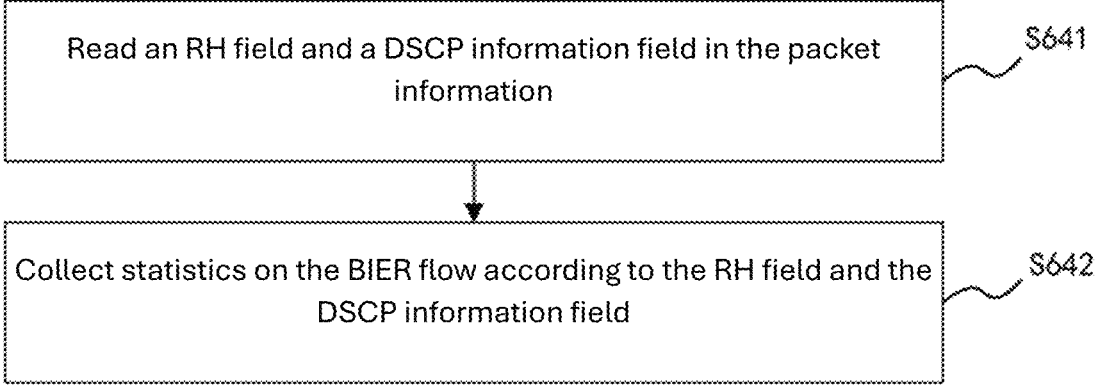
FIG. 14 is a detailed flowchart of S400 in the case of IPV6 encapsulation and using a preset statistical rule based on DSCP information in an information processing method according to another embodiment of the present disclosure.

FIG. 14 is a detailed flowchart of S400 in the case of IPV6 encapsulation and using a preset statistical rule based on DSCP information in an information processing method according to another embodiment of the present disclosure. S400 may include, but not limited to, the following steps S641 and S642.

At S641, a Routing Header (RH) field and a DSCP information field in the packet information are read.

At S642, statistics on the BIER flow are collected according to the RH field and the DSCP information field.

In an embodiment, in a case where the preset statistical rule is based on DSCP information, statistics on BIER flows whose DSCP field is set to 6 need to be collected. In this case, it is necessary to collect statistics on BIER flows which are based on Ethernet encapsulation and IPv6 encapsulation and whose DSCP field is set to 6.

When statistics on the BIER flow based on IPV6 encapsulation are collected, the BIER flow based on IPV6 encapsulation includes a variety of cases. For the flow whose IPV6 Next Header is set to 43, i.e., RH containing a BIER type, in the embodiment of the present disclosure, the RH field and the DSCP information field in the packet information are read, and then it is determined according to data in the RH field and the DSCP information field whether statistics on the BIER flow need to be collected.

Based on the embodiments in FIG. 11 to FIG. 14, in the case where the preset statistical rule is based on the DSCP information, one or more of the implementations in FIG. 11 to FIG. 14 may be executed.

Figure 15:
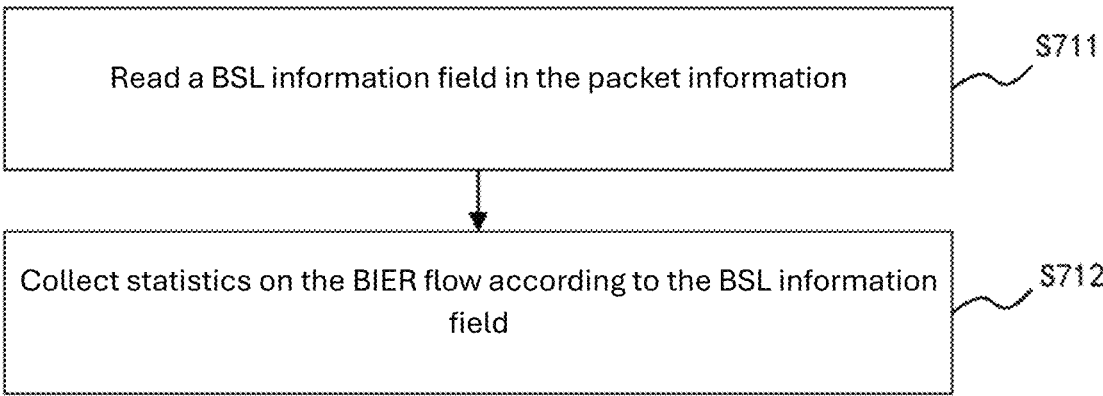
FIG. 15 is a detailed flowchart of S400 using a preset statistical rule based on Bit String Length (BSL) information in an information processing method according to an embodiment of the present disclosure.

FIG. 15 is a detailed flowchart of S400 using a preset statistical rule based on BSL information in an information processing method according to an embodiment of the present disclosure. S400 may include, but not limited to, the following steps S711 and S712.

At S711, a BSL information field in the packet information is read.

At S712, statistics on the BIER flow are collected according to the BSL information field.

In an embodiment, in a case where the preset statistical rule is based on BSL information, statistics on BIER flows whose BSL field is set to 256 need to be collected. In this case, it is necessary to filter the BIER flows to collect statistics on only flows that are based on Ethernet, MPLS, and IPv6 encapsulation and whose BSL field is set to 3.

Therefore, in the embodiment of the present disclosure, the BSL information field in the packet information is read, and then it is determined according to data in the BSL information field whether statistics on the BIER flow need to be collected.

Figure 16:
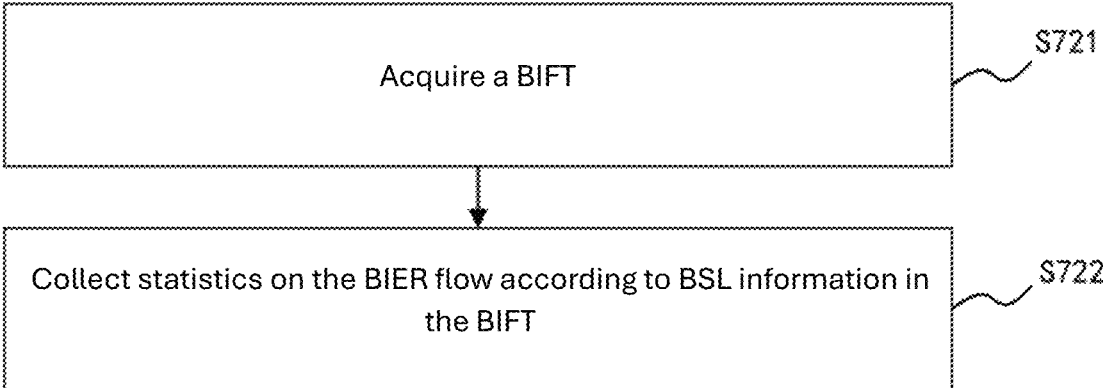
FIG. 16 is a detailed flowchart of S400 using a preset statistical rule based on BSL information in an information processing method according to another embodiment of the present disclosure.

FIG. 16 is a detailed flowchart of S400 using a preset statistical rule based on BSL information in an information processing method according to another embodiment of the present disclosure. S400 may include, but not limited to, the following steps S721 and S722.

At S721, a Bit Index Forwarding Table (BIFT) is acquired.

At S722, statistics on the BIER flow are collected according to BSL information in the BIFT.

In an embodiment, in a case where the preset statistical rule is based on BSL information, in addition to collecting statistics in the manner shown in FIG. 15, an entry having a BSL of 256 in the BIFT may be labeled with a statistics required tag, and statistics on the BIER flow are collected only when such an entry is used for processing during forwarding. In addition to the method of labeling the entry with the statistics required tag, other methods may also be used. For example, when it is found that a BSL value corresponding to an entry found is a BSL requiring statistics, corresponding statistics may be collected.

Therefore, in the embodiment of the present disclosure, the BIFT may be acquired, and then it is determined according to the BSL information in the BIFT whether statistics on the BIER flow need to be collected.

Figure 17:
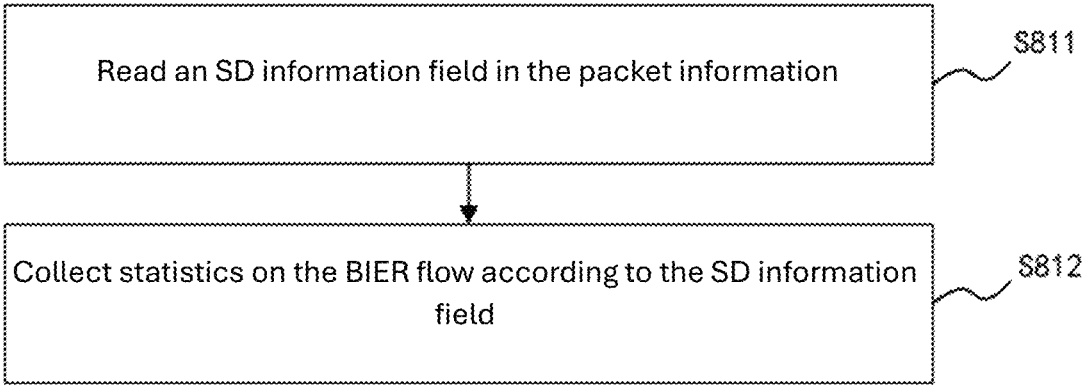
FIG. 17 is a detailed flowchart of S400 using a preset statistical rule based on Sub-Domain (SD) information in an information processing method according to an embodiment of the present disclosure.

FIG. 17 is a detailed flowchart of S400 using a preset statistical rule based on SD information in an information processing method according to an embodiment of the present disclosure. S400 may include, but not limited to, the following steps S811 and S812.

At S811, an SD information field in the packet information is read.

At S812, statistics on the BIER flow are collected according to the SD information field.

Figure 18:
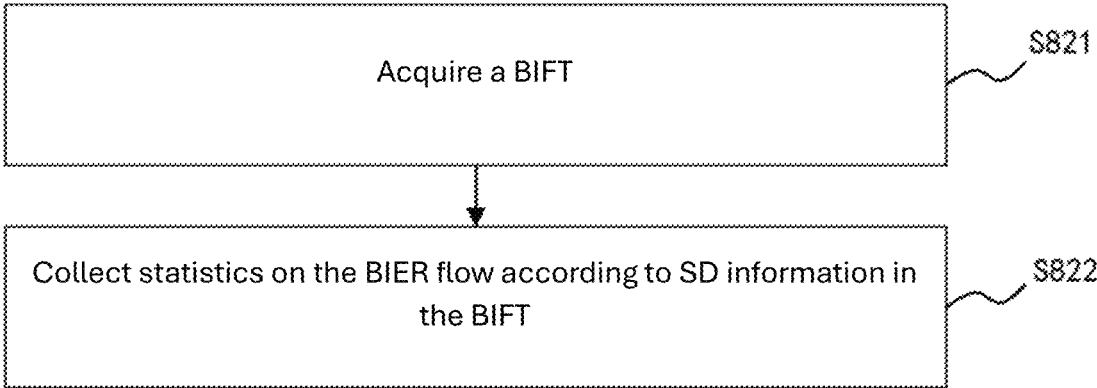
FIG. 18 is a detailed flowchart of S400 using a preset statistical rule based on SD information in an information processing method according to another embodiment of the present disclosure.

FIG. 18 is a detailed flowchart of S400 using a preset statistical rule based on SD information in an information processing method according to another embodiment of the present disclosure. S400 may include, but not limited to, the following steps S821 and S822.

At S821, a BIFT is acquired.

At S822, statistics on the BIER flow are collected according to SD information in the BIFT.

Based on the embodiments in FIG. 17 to FIG. 18, in the case where the preset statistical rule is based on the SD information, the method steps in FIG. 17 or FIG. 18 may be executed.

In an embodiment, if statistics on BIER flows of an SD need to be collected, entries in the BIFT that correspond to the SD are labeled with a statistics required tag, and if a match is found among such entries for the BIER flow being processed, statistics on the BIER flow are collected correspondingly. For example, the BIFT includes entries with an SD of 0 and entries with an SD of 1. When statistics on BIER flows with the SD of 0 need to be collected, only the entries corresponding to the SD of 0 need to be labeled with the statistics required tag. In addition to the method of labeling the entry with the statistics required tag, other methods may also be used. For example, only when it is found that an SD value corresponding to an entry found is an SD requiring statistics, corresponding statistics may be collected. Alternatively, when it is directly determined that values of some bits in a BIFT-ID in the BIER flow are the SD requiring statistics, e.g., values of the 5th to 12th bits in the BIFT-ID in the BIER flow are 0, and statistics on BIER flows with the SD of 0 need to be collected, the BIER flow is a flow on which statistics need to be collected.

Figure 19:
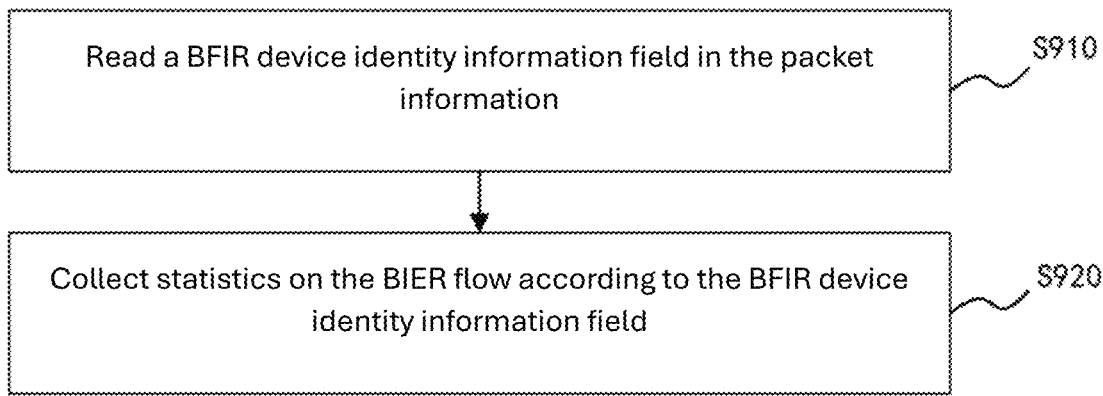
FIG. 19 is a detailed flowchart of S400 using a preset statistical rule based on BIT-Forwarding Ingress Router (BFIR) device identity information in an information processing method according to an embodiment of the present disclosure.

FIG. 19 is a detailed flowchart of S400 using a preset statistical rule based on BFIR device identity information in an information processing method according to an embodiment of the present disclosure. S400 may include, but not limited to, the following steps S910 and S920.

At S910, a BFIR device identity information field in the packet information is read.

At S920, statistics on the BIER flow are collected according to the BFIR device identity information field.

In an embodiment, in a case where the preset statistical rule is based on BFIR device identity information, statistics on BIER flows from one or more ingress BFIR devices need to be collected. In this case, statistics on the BIER flow being processed are collected only when it is found that a BFIR-id field value of the packet is the same as a BFIR device value requiring statistics. For example, if statistics on only BIER flows sent by a BFIR1 device need to be collected, statistics on the BIER flow being processed are collected only when a BFIR-ID value in the BIER packet is set to the BFR-ID value of the device.

Therefore, in the embodiment of the present disclosure, the BFIR device identity information field in the packet information is read, and then it is determined according to data in the BFIR device identity information field whether statistics on the BIER flow need to be collected.

Figure 20:
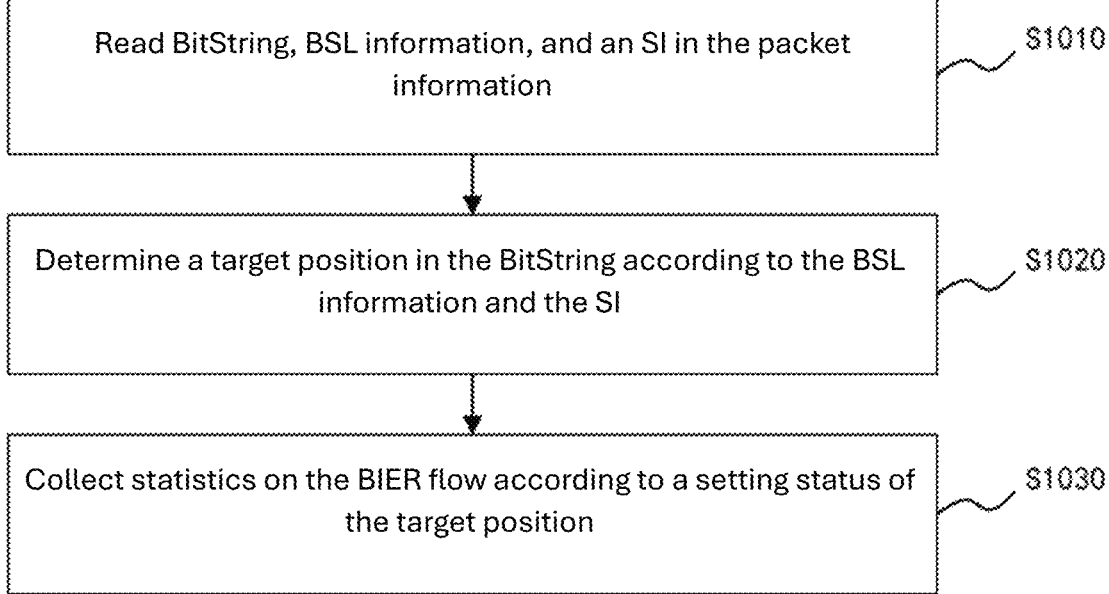
FIG. 20 is a detailed flowchart of S400 using a preset statistical rule based on BFER device identity information in an information processing method according to an embodiment of the present disclosure.

FIG. 20 is a detailed flowchart of S400 using a preset statistical rule based on BFER device identity information in an information processing method according to an embodiment of the present disclosure. S400 may include, but not limited to, the following steps S1010, S1020, and S1030.

At S1010, BitString, BSL information, and a Set Identifier (SI) in the packet information are read.

At S1020, a target position in the BitString is determined according to the BSL information and the SI.

At S1030, statistics on the BIER flow are collected according to a setting status of the target position.

In an embodiment, in a case where the preset statistical rule is based on BFER device identity information, statistics on BIER flows sent to one or more BFER devices need to be collected. In this case, statistics on the BIER flow being processed are collected only when the corresponding BFR-id bits in the BitString are set. According to a method of determining the setting, when a BIER flow is received, a corresponding BSL and SI are determined, and then it is determined whether the setting in the BitString corresponds to a BFR-id of a BFER requiring statistics. The setting is determined according to k=BFR-id-SI*BSL, and the k-th bit corresponds to the k-th bit in the BitString. It is assumed that BFR-id values of destination BFER devices requiring statistics are 1 and 258, and BSLs corresponding to entries in the BIFT are 64 and 256. When the received BIER flow corresponds to an entry with the BSL of 64 and an SI of 0, traffic statistics need to be collected when the first bit in the BitString is set. When the received BIER flow corresponds to an entry with the BSL of 64 and an SI of 4, traffic statistics need to be collected when the second bit in the BitString is set. When the received BIER flow corresponds to an entry with the BSL of 256 and an SI of 0, traffic statistics need to be collected when the first bit in the BitString is set. When the received BIER flow corresponds to an entry with the BSL of 256 and an SI of 1, traffic statistics need to be collected when the second bit in the BitString is set.

Therefore, in the embodiment of the present disclosure, the BitString, the BSL information, and the SI in the packet information are read, then the target position in the BitString is determined according to the BSL information and the SI, and it is determined according to the setting status of the target position whether statistics on the BIER flow need to be collected.

Based on the method steps of the above embodiment, the most basic BIER flow identification is realized through the BIER flow encapsulation identification, and other filtering methods based on BSL, TC/DSCP, SD, ingress BFIR-ID, BFER, specified flow, etc., need to rely on the correct identification of the BIER flow. One or any combination of these filtering methods may be used in combination with BIER flow encapsulation identification.

Figure 21:
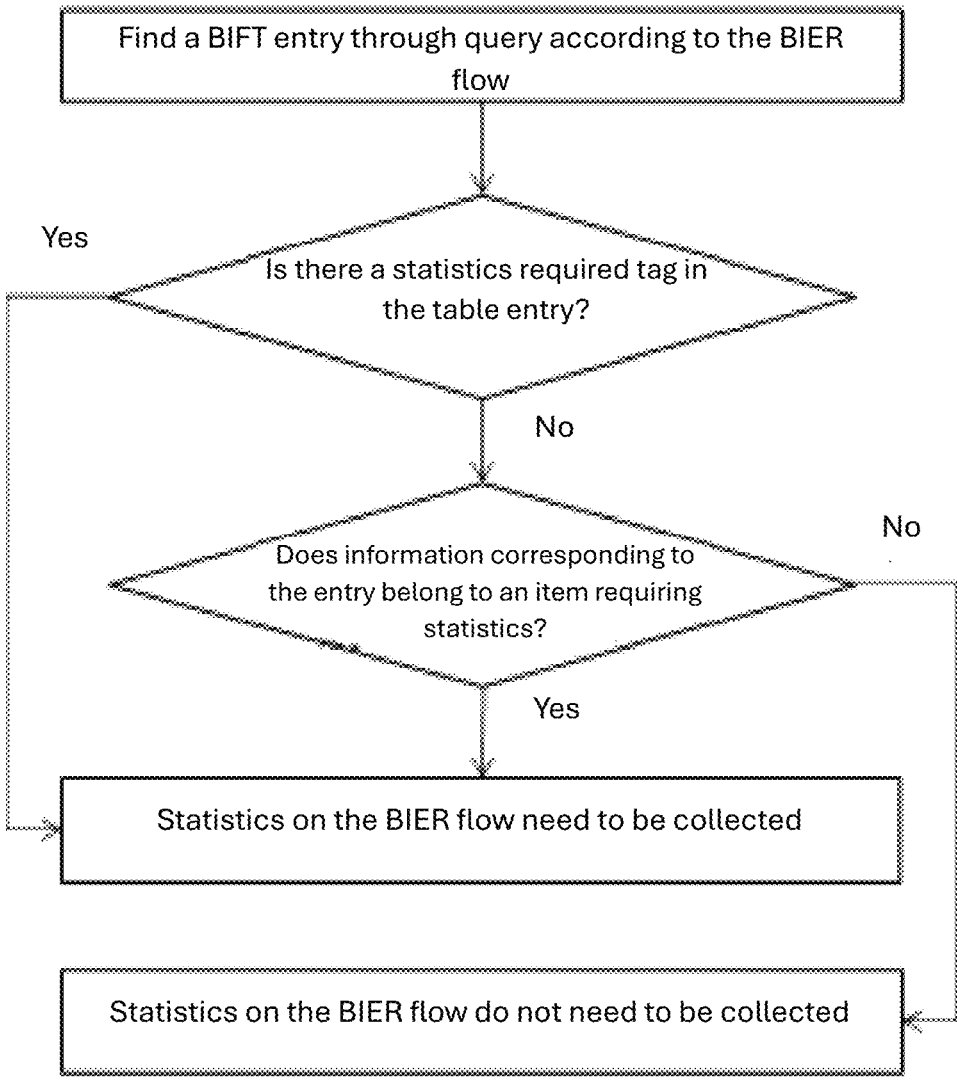
FIG. 21 is a flowchart of processing and statistics based on a forwarding entry according to an embodiment of the present disclosure.

In addition, whether to collect statistics on a flow may be determined by labeling a statistics required tag on the corresponding forwarding entry. Alternatively, the forwarding entry may not need to be modified; instead, when the forwarding entry is found, it is determined according to the content of the forwarding entry whether the forwarding entry belongs to a range requiring statistics. A specific determination process is shown in FIG. 21.

Statistics on the BIER flow may include, but not limited to, the number of received packets or bytes of the BIER flow, the egress interface for sending the BIER flow, the number of sent packets or bytes of the BIER flow, the number of dropped packets or bytes of the BIER flow, a timestamp at which the BIER flow arrives at the device, and a timestamp at which the BIER flow leaves the device.

Figure 22:
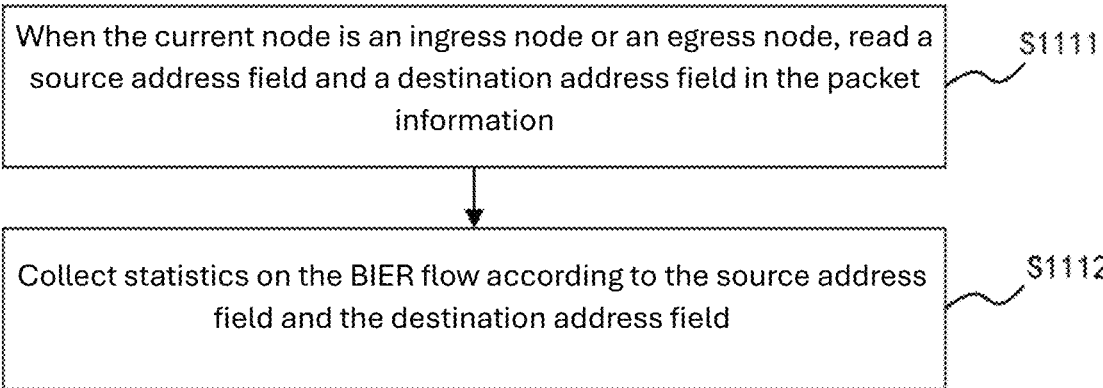
FIG. 22 is a detailed flowchart of S400 using a preset statistical rule based on a source address and a destination address in an information processing method according to an embodiment of the present disclosure.

FIG. 22 is a detailed flowchart of S400 using a preset statistical rule based on a source address and a destination address in an information processing method according to an embodiment of the present disclosure. S400 may include, but not limited to, the following steps S1111 and S1112.

At S1111, when the current node is an ingress node or an egress node, a source address field and a destination address field in the packet information are read.

At S1112, statistics on the BIER flow are collected according to the source address field and the destination address field.

Figure 23:
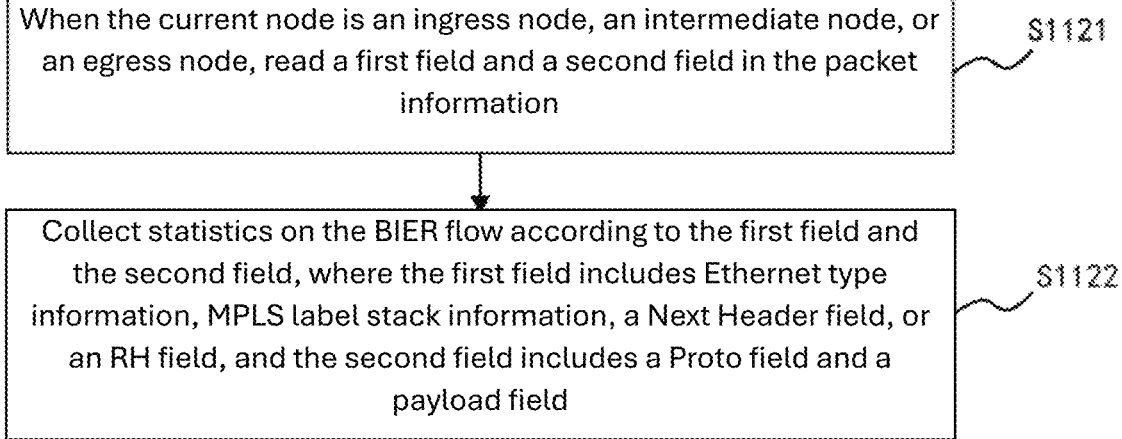
FIG. 23 is a detailed flowchart of S400 using a preset statistical rule based on a source address and a destination address in an information processing method according to another embodiment of the present disclosure.

FIG. 23 is a detailed flowchart of S400 using a preset statistical rule based on a source address and a destination address in an information processing method according to another embodiment of the present disclosure. S400 may include, but not limited to, the following steps S1121 and S1122.

At S1121, when the current node is an ingress node, an intermediate node, or an egress node, a first field and a second field in the packet information are read.

At S1122, statistics on the BIER flow are collected according to the first field and the second field, where the first field includes Ethernet type information, MPLS label stack information, a Next Header field, or an RH field, and the second field includes a Proto field and a payload field.

Figure 24:
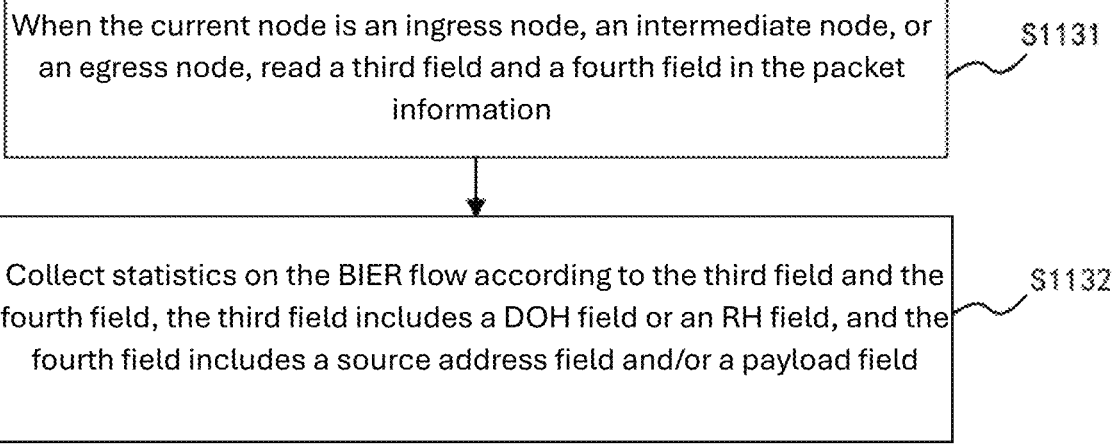
FIG. 24 is a detailed flowchart of S400 using a preset statistical rule based on a source address and a destination address in an information processing method according to another embodiment of the present disclosure.

FIG. 24 is a detailed flowchart of S400 using a preset statistical rule based on a source address and a destination address in an information processing method according to another embodiment of the present disclosure. S400 may include, but not limited to, the following steps S1131 and S1132.

At S1131, when the current node is an ingress node, an intermediate node, or an egress node, a third field and a fourth field in the packet information are read.

At S1132, statistics on the BIER flow are collected according to the third field and the fourth field, where the third field includes a DOH field or an RH field, and the fourth field includes a source address field and/or a payload field.

Based on the embodiments in FIG. 22 to FIG. 24, in the case where the preset statistical rule is based on the source address and the destination address, one or more of the implementations in FIG. 22 to FIG. 24 may be executed.

In an embodiment, it is assumed that statistics on a multicast flow entering the BIER domain need to be collected, it is necessary to further determine according to the packet whether the multicast flow belongs to a range requiring statistics. Because the ingress node BFIR and the egress node BFER need to encapsulate and decapsulate the BIER header of the multicast flow, they may directly collect statistics according to characteristics of the flow, such as a 2-tuple (source address and destination address) or multi-group (source address, destination address, source port number, and destination port number). When the multicast flow belongs to a Virtual Private Network (VPN), whether to identify and collect statistics on the flow may further be determined according to the VPN value.

However, intermediate devices BFRs in the BIER domain need to perform further identification before identifying and collecting statistics on the flow. First, distinguishing is performed according to BIER encapsulation. For BIER flows based on Ethernet encapsulation and MPLS encapsulation, and encapsulation with an IPV6 Next Header indicating the BIER type or encapsulation with an IPV6 Next Header which is set to RH containing the BIER type, whether this flow is a flow requiring statistics needs to be determined with reference to values of the Proto field and other fields of the BIER header as well as fields in the payload after the BIER header. For encapsulation with an IPV6 Next Header which is set to DOH containing the BIER type option or encapsulation with an IPV6 Next Header which is set to RH containing the BIER type, whether this flow is a flow requiring statistics needs to be determined with reference to a source address field of the IPV6 header and/or fields in the payload after the IPV6 extension header.

In an embodiment, it is assumed that statistics on a multicast flow (source address 201.1.1.1, destination address 224.1.1.1) need to be collected, and the multicast flow does not belong to any VPN, and the encapsulation mode in the BIER domain is MPLS encapsulation. In this case, the intermediate devices BFRs, after receiving the BIER flow, need to further determine whether the value of the Proto field of the BIER flow is set to a value indicating IPv4 (such as 4), then further parse an IPv4 source address and destination address after the BIER header to determine whether they are the same as (source address 201.1.1.1, destination address 224.1.1.1), and if yes, collect statistics on this flow.

In an embodiment, it is assumed that statistics on a multicast flow (source address 201.1.1.1, destination address 224.1.1.1) need to be collected, the multicast flow belongs to a VPN, e.g., VPN 1, the flow is injected into the BIER domain through an ingress device BFIR1, and the encapsulation method is BIER Ethernet encapsulation. In this case, the intermediate devices BFRs further needs to know an identification value assigned by the ingress node BFIR1 for the flow. Assuming that an MPLS label value of 200 is assigned to the flow or the VPN by the ingress node BFIR, the intermediate devices BFRs, after receiving the BIER flow, determines whether the Proto field represents an MPLS value (such as 2) and whether the BFIR-ID field of the BIER header is filled in with a BFR-ID of BFIR1, further determines whether the label value following the BIER header is equal to 200, and if the above conditions are all met, collects statistics on the flow.

In an embodiment, it is assumed that statistics on a multicast traffic from VPN1 need to be collected, the encapsulation method in the BIER domain is that the Next Header of the IPV6 header is set to the BIER type, and an IPV6 Service Identifier (SID) value assigned by the ingress device BFIR1 is 2001::201. In this case, after receiving the BIER flow, the intermediate devices BFRs need to determine whether the Proto field represents an IPV6 SID type value and whether the BFIR-ID field of the BIER header is filled in with the BFR-ID of BFIR1, further determines whether the value following the BIER header is equal to 2001::201, and if these conditions are all met, collects statistics on the flow.

In an embodiment, it is assumed that statistics on an IPV6 multicast traffic from VPN1 need to be collected, the encapsulation method in the BIER domain is that the Next Header of the IPV6 header is set to DOH carrying the BIER type option, and an IPV6 SID value assigned by the ingress device BFIR1 is 2001::201. In this case, after receiving the BIER flow, the intermediate devices BFRs need to determine whether the source address field of the IPV6 header is the same as the IPV6 SID value, if yes, collect statistics on the flow. If IPv6 SID values assigned by BFIR1 to all multicast flows of VPN1 are 2001::202, the intermediate devices BFRs, after receiving the BIER flow and determining that the source address field of the IPV6 header is the same as the IPV6 SID value according to the encapsulation, needs to further perform a determining operation on the IPV6 header and the payload part after its extension header (DOH), to determine whether a Next Header value of the DOH represents IPv6 and whether the source and destination addresses of the IPV6 packet in the payload are consistent with those of the IPV6 multicast flow, and if these conditions are all met, collect statistics on the IPV6 multicast flow.

In an embodiment, assuming that statistics on a Broadcast, Unknown, Multicast (BUM) flow from an Ethernet VPN (EVPN) need to be collected, the determining operations may be performed using methods similar to those described above. For the identification of traffic after the BIER header, a Media Access Control (MAC) address matching method may be used. Thus, statistics on Layer 2 traffic can be collected.

In addition, in the embodiments of the present disclosure, the preset statistical rule may not be set, i.e., statistics on all BIER flows may be collected without any restrictions in the embodiments of the present disclosure. In this case, the statistical process may be as shown in FIG. 25.

Figure 25:
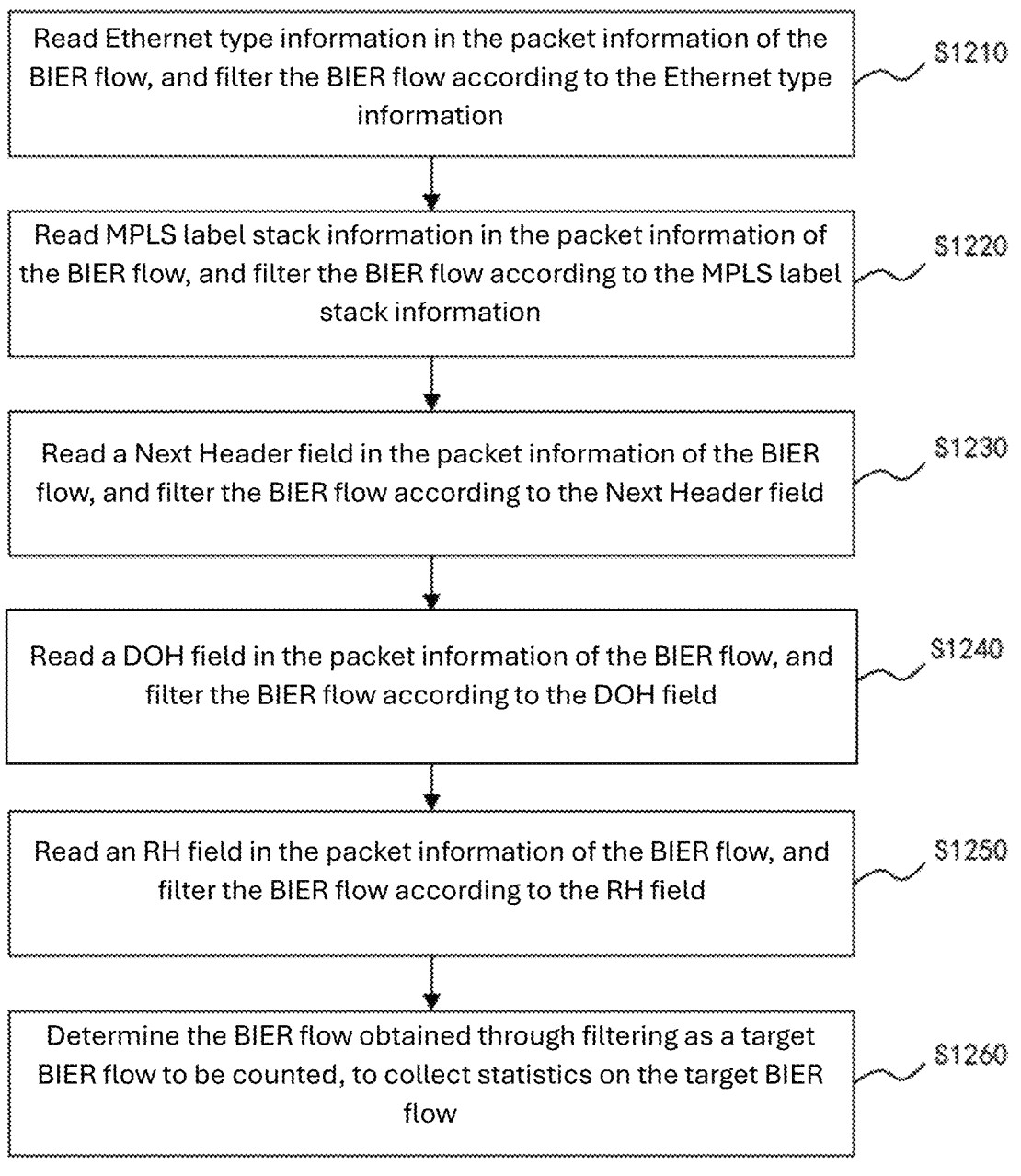
FIG. 25 is a flowchart of performing statistics on all BIER flows without a preset statistical rule in an information processing method according to an embodiment of the present disclosure.

FIG. 25 is a flowchart of performing statistics on all BIER flows without a preset statistical rule in an information processing method according to an embodiment of the present disclosure. After S100, the information processing method may further include, but not limited to, the following steps S1210, S1220, S1230, S1240, S1250, and S1260.

At S1210, Ethernet type information in the packet information of the BIER flow is read, and the BIER flow is filtered according to the Ethernet type information.

At S1220, MPLS label stack information in the packet information of the BIER flow is read, and the BIER flow is filtered according to the MPLS label stack information.

At S1230, a Next Header field in the packet information of the BIER flow is read, and the BIER flow is filtered according to the Next Header field.

At S1240, a DOH field in the packet information of the BIER flow is read, and the BIER flow is filtered according to the DOH field.

At S1250, an RH field in the packet information of the BIER flow is read, and the BIER flow is filtered according to the RH field.

At S1260, the BIER flow obtained through filtering is determined as a target BIER flow to be counted, to collect statistics on the target BIER flow.

If statistics on all BIER flows need to be collected without any restrictions, the BIER observation point needs to collect statistics on BIER flows based on Ethernet encapsulation, BIER flows based on MPLS encapsulation, and BIER flows based on IPv6 encapsulation. The BIER flows based on Ethernet encapsulation are characterized in that the Ethernet type is set to 0xAB37. The BIER flows based on MPLS encapsulation are characterized in that the bottommost label of the MPLS label stack is a label indicating BIER forwarding. The BIER flows based on IPv6 encapsulation include the following three case. In a first case, the IPV6 Next Header is set to a BIER type. In a second case, the IPV6 Next Header is set to 60, i.e., DOH containing the BIER type option. In a third case, the IPV6 Next Header is set to 43, i.e., RH containing a BIER type.

Figure 26:
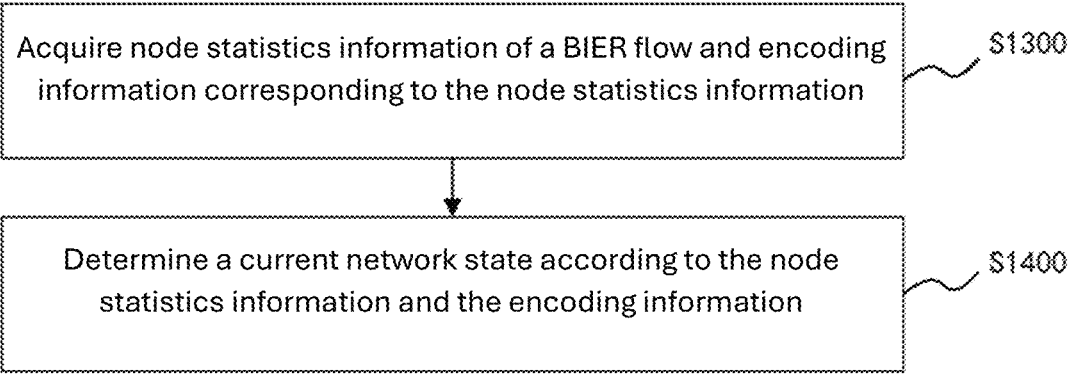
FIG. 26 is a flowchart of an information processing method according to another embodiment of the present disclosure.

FIG. 26 is a flowchart of an information processing method according to another embodiment of the present disclosure. The information processing method may be applied to the collector in FIG. 1 to FIG. 2 or the BIER observation point in FIG. 2, and may include, but not limited to, the following steps S1300 to S1400.

At S1300, node statistics information of a BIER flow and encoding information corresponding to the node statistics information are acquired.

At S1400, a current network state is determined according to the node statistics information and the encoding information.

In an embodiment, in a case where analysis and processing are performed by a collector, when sending the node statistics information, the BIER observation point carries encoding information of relevant data, for the collector to decode. The encoding information includes two parts: a template and data. In addition to one or more elements such as the number of packets or bytes of the BIER flow, the egress interface for sending the BIER flow, the number of sent packets or bytes of the BIER flow, the number of dropped packets or bytes of the BIER flow, a timestamp at which the BIER flow arrives at the device, and a timestamp at which the BIER flow leaves the device, the template may also include one or more limiting elements such as a BSL, an ingress BFIR device ID, a specified TC/DSCP, a specified BIER SD, a specified egress BFER device, and a specified multicast flow.

The collector may obtain a transmission delay of BIER flow in the network as a traffic engineering parameter according to timestamp information in the node statistics information. Alternatively, the collector may compare traffic entering the BIER domain with traffic exiting the BIER domain to determine whether there is spoof or attack traffic in the network.

In an embodiment, in a case where analysis and processing are performed by the BIER observation point, the BIER observation point determines the current network state according to the node statistics information after obtaining the node statistics information. For example, the BIER observation point may obtain a transmission delay of BIER flow in the network as a traffic engineering parameter according to timestamp information in the node statistics information. Alternatively, the BIER observation point may compare traffic entering the BIER domain with traffic exiting the BIER domain to determine whether there is spoof or attack traffic in the network.

Figure 27:
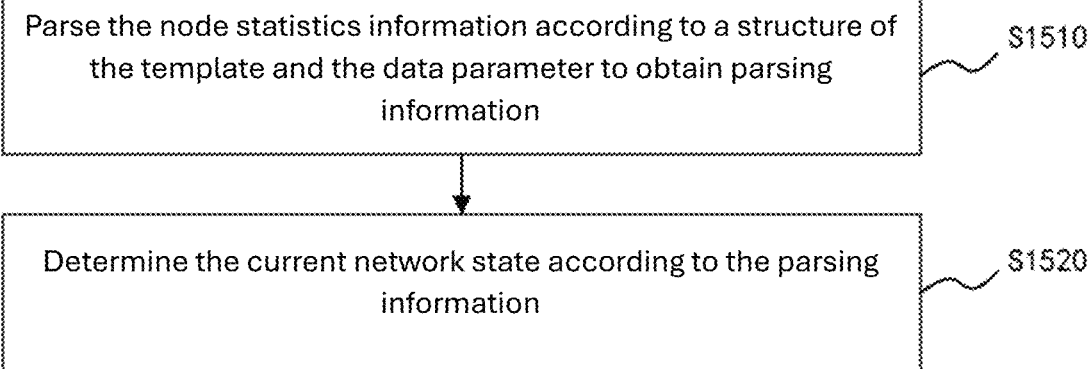
FIG. 27 is a detailed flowchart of S1400 in an information processing method according to an embodiment of the present disclosure.

FIG. 27 is a detailed flowchart of S1400 in an information processing method according to an embodiment of the present disclosure. The encoding information includes a template and a data parameter in the template. S1400 may include, but not limited to, the following steps S1510 and S1520.

At S1510, the node statistics information is parsed according to a structure of the template and the data parameter to obtain parsing information.

At S1520, the current network state is determined according to the parsing information.

After collecting statistics on the corresponding flow, the observation point may send statistical data to the collector in the form of a template and data. The template is provided to enable the collector to learn the structure of the sent data and therefore correctly parse the data.

FIG. 28 shows a template and data in a case where an observation point (e.g., BFR1) collects statistics on BIER flows with a DSCP value of 6 in a specific BIER SD (e.g., 0), including the number of received packets of the BIER flow, the number of received bytes of the BIER flow, the number of dropped packets of the BIER flow, a timestamp at which the BIER flow arrives at the device, and a timestamp at which the BIER flow leaves the device. The values listed after the statistical data, such as 501 to 512, 152, 153, etc., are type values of information elements that the collector can identify. The collector knows the meaning corresponding to the type value. For example, bierSubDomainId represents BIER SD, and the value in the BIER flow record following this field is filled in with the value of the SD requiring statistics, i.e., an SD value of 0. bierDiffServCodePoint represents the DSCP field, and the value in the BIER flow record following this field is filled in with the DSCP value of the flow requiring statistics, i.e., a DSCP value of 6. bierPacketTotalCount represents the number of packets of the BIER flow, bierOctetTotalCount represents the number of bytes of the BIER flow, bierDroppedPacketCount represents the number of dropped BIER flow packets, and flowStartMilliseconds and flowEndMilliseconds respectively represent the time point at which the BIER flow enters the observation point device and the time point at which the BIER flow leaves the observation point device.

FIG. 29 shows a template and data in a case where an observation point (e.g., BFR3 or BFER1) collects statistics on BIER flows with a BSL of 256 from a specific BFIR device, including an incremental number of packets and an incremental number of bytes of the BIER flow. Similarly, the values listed after the statistical data, such as 503, 504, 513, 514, etc., are type values of information elements that the collector can identify. The collector knows the meaning corresponding to the type value. For example, bierBsl represents the length of BitStringLength, and the value in the BIER flow record following this field is filled in with 256. bierBfirId represents the BFR-ID of the specified BFIR device, and the value in the BIER flow record following this field is filled in with the BFR-ID value of the specified BFIR device. bierPacketDeltaCount represents the number of BIER flow packets received since the last sending record, and bierOctetDeltaCount represents the number of BIER flow bytes received since the last sending record.

FIG. 30 shows a template and data in a case where an observation point (e.g., BFR1) collects statistics on forwarding of a specific multicast flow, including the number of received packets of the BIER flow, the number of received bytes of the BIER flow, a timestamp at which the flow arrives at the observation point device, and a timestamp at which the flow leaves the observation point device. Similarly, the values listed after the statistical data, such as 8, 12, 501, 502, 152, 153, etc., are type values of information elements that the collector can identify. The collector knows the meaning corresponding to the type value. For example, sourceIPv4Address represents the source address of the specific multicast flow, destinationIPv4Address represents the destination address of the specific multicast flow, etc.

FIG. 31 shows a template and data in a case where an observation point (e.g., BFR3) collects statistics on BIER flows of a specific BIER encapsulation type with a specific BFER device (e.g., BFER1) as the destination, including an ingress interface and an egress interface for receiving flows of this type, and the number of packets of this type. Similarly, the values listed after the statistical data, such as 10, 14, 501, 521, 522, etc., are type values of information elements that the collector can identify. The collector knows the meaning corresponding to the type value. For example, bierEncapType represents the BIER flow encapsulation type, e.g., values 1, 2, and 3 are respectively used to represent Ethernet encapsulation, MPLS encapsulation, and IPV6 encapsulation; bierBferId represents the BFR-ID value of the specific BFER device; ingressInterface represents the serial number of the ingress interface for receiving the flow, and egressInterface represents the serial number of the egress interface used for forwarding the packet, etc.

The corresponding statistical data is sent to the collector by the observation point together with the template. According to a sending method, the fields in the template are immediately followed by the corresponding statistical data, and the order and length of the statistical data are exactly the same as those described in the template. Therefore, the collector can normally obtain the statistical data by parsing according to the template.

The above cases are merely some examples given in the embodiments of the present disclosure, and the above elements may be arbitrarily combined in actual applications, which is not limited in the embodiments of the present disclosure.

Figure 32:
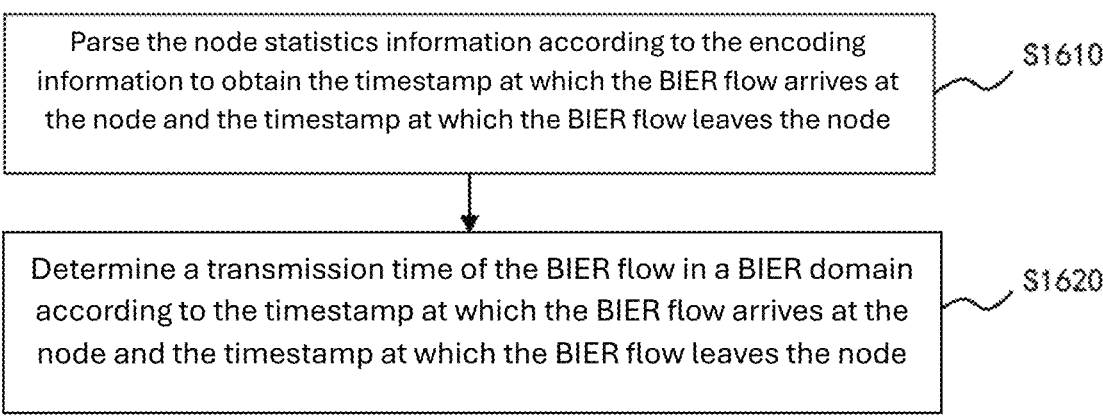
FIG. 32 is a detailed flowchart of S1400 when node statistics information includes a timestamp at which the BIER flow arrives at a node and a timestamp at which the BIER flow leaves the node in an information processing method according to an embodiment of the present disclosure.

FIG. 32 is a detailed flowchart of S1400 when node statistics information includes a timestamp at which the BIER flow arrives at a node and a timestamp at which the BIER flow leaves the node in an information processing method according to an embodiment of the present disclosure. S1400 may include, but not limited to, the following steps S1610 and S1620.

At S1610, the node statistics information is parsed according to the encoding information to obtain the timestamp at which the BIER flow arrives at the node and the timestamp at which the BIER flow leaves the node.

At S1620, a transmission time of the BIER flow in a BIER domain is determined according to the timestamp at which the BIER flow arrives at the node and the timestamp at which the BIER flow leaves the node.

In an embodiment, for example, the statistical data shown in the template in FIG. 28 is collected from BFIR1, BFR1, BFR3, and BFER1. The processing time of each device for the BIER flow with a DSCP value set to 6 in the sub-domain of BIER SD 0 may be obtained, i.e., the time for each device to process flows of this type of may be obtained according to the difference between flowStartMilliseconds and flowEndMilliseconds of the device. The sum of the time of the devices is transmission time of the flows of this type in this BIER domain. The transmission time may be used as an important parameter of traffic engineering.

Figure 33:
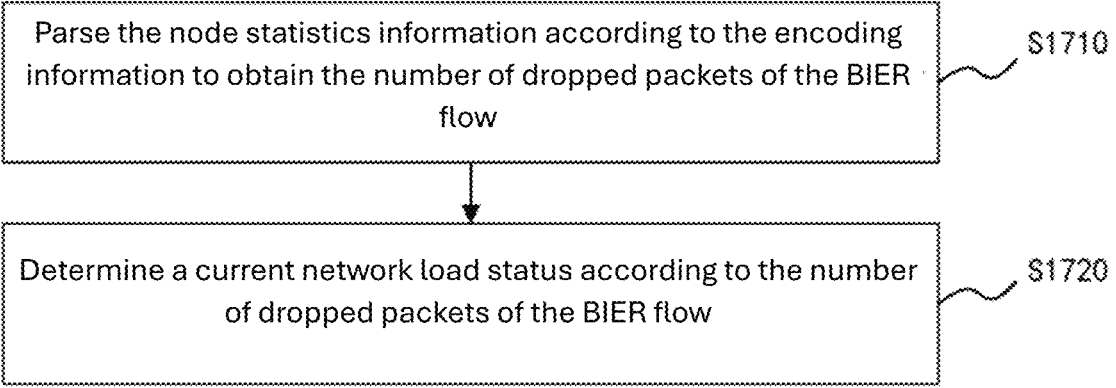
FIG. 33 is a detailed flowchart of S1400 when node statistics information includes a number of dropped packets of the BIER flow in an information processing method according to an embodiment of the present disclosure.

FIG. 33 is a detailed flowchart of S1400 when node statistics information includes a number of dropped packets of the BIER flow in an information processing method according to an embodiment of the present disclosure. S1400 may include, but not limited to, the following steps S1710 and S1720.

At S1710, the node statistics information is parsed according to the encoding information to obtain the number of dropped packets of the BIER flow.

At S1720, a current network load status is determined according to the number of dropped packets of the BIER flow.

In an embodiment, for example, if the statistical data is collected from BFR1 using the template shown in FIG. 28, and it is found that the number of BIER packets discarded by the device reaches a level, it indicates that the device may be overloaded. In this case, the collector needs to notify the network administrator or the network controller, such that the network administrator or the network controller issues an adjusted configuration to alleviate or eliminate the overload of the device.

Figure 34:
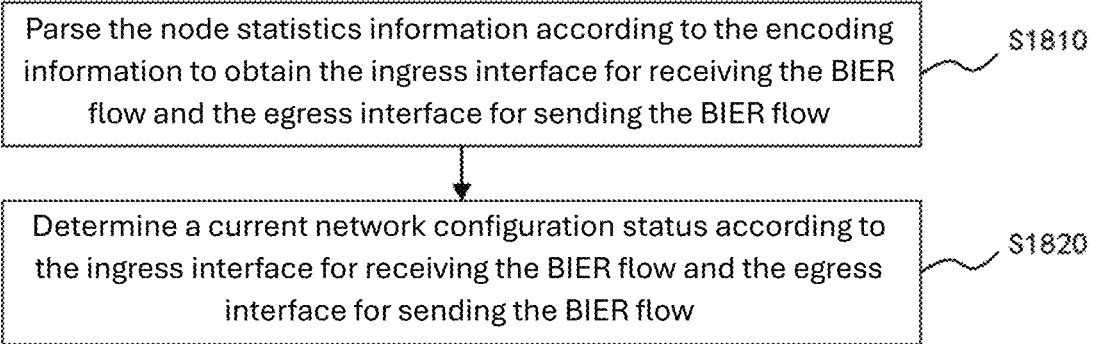
FIG. 34 is a detailed flowchart of S1400 when node statistics information includes an ingress interface for receiving the BIER flow and an egress interface for sending the BIER flow in an information processing method according to an embodiment of the present disclosure.

FIG. 34 is a detailed flowchart of S1400 when node statistics information includes an ingress interface for receiving the BIER flow and an egress interface for sending the BIER flow in an information processing method according to an embodiment of the present disclosure. S1400 may include, but not limited to, the following steps S1810 and S1820.

At S1810, the node statistics information is parsed according to the encoding information to obtain the ingress interface for receiving the BIER flow and the egress interface for sending the BIER flow.

At S1820, a current network configuration status is determined according to the ingress interface for receiving the BIER flow and the egress interface for sending the BIER flow.

In an embodiment, it is assumed that the collector collects statistics on BIER flows of a specific encapsulation type from the BFR1 device with a specific BFER device as the destination by using the template shown in FIG. 31. If it is found that there is no traffic or that the collected ingress and egress interface serial numbers are inconsistent with those expected, it indicates that there may be an abnormality such as a configuration error in the network. The collector records the abnormality and notifies the network administrator or the network controller to remind the network administrator or the network controller to troubleshoot the network configuration, etc., so as to find the cause of the abnormality as soon as possible.

Figure 35:
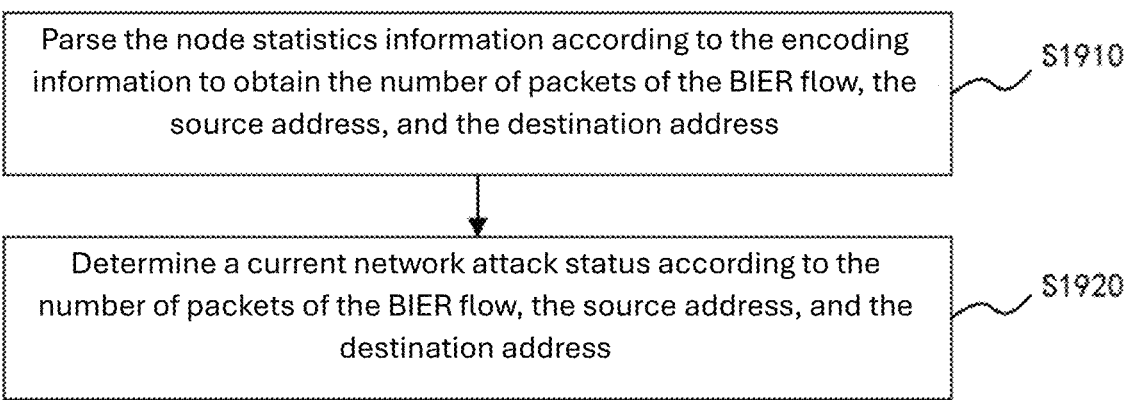
FIG. 35 is a detailed flowchart of S1400 when node statistics information includes a number of packets of the BIER flow and packet information includes a source address and a destination address in an information processing method according to an embodiment of the present disclosure.

FIG. 35 is a detailed flowchart of S1400 when node statistics information includes a number of packets of the BIER flow and packet information includes a source address and a destination address in an information processing method according to an embodiment of the present disclosure. S1400 may include, but not limited to, the following steps S1910 and S1920.

At S1910, the node statistics information is parsed according to the encoding information to obtain the number of packets of the BIER flow, the source address, and destination address.

At S1920, a current network attack status is determined according to the number of packets of the BIER flow, the source address, and the destination address.

In an embodiment, it is assumed that the collector collects statistical data for a specific multicast flow (e.g., source address 201.1.1.1 and destination address 224.1.1.1) from devices BFIR1 and BFER1 by using the template shown in FIG. 30, and the two should normally be not much different. However, when an abnormality occurs in the network, e.g., the number of BIER packets of the specific multicast flow on BFER1 is much greater than the number of BIER packets of the multicast flow on BFIR1, and the multicast flow can enter the BIER domain only through BFIR1, it indicates that there may be spoof attack traffic in the network, e.g., a node in the network is copying the BIER packets sent by BFIR1 with an intention to occupy network bandwidth. In this case, the collector needs to notify the network administrator or the network controller of the abnormality to prevent the spoof attack traffic from continuing to occupy the bandwidth.

Figure 36:
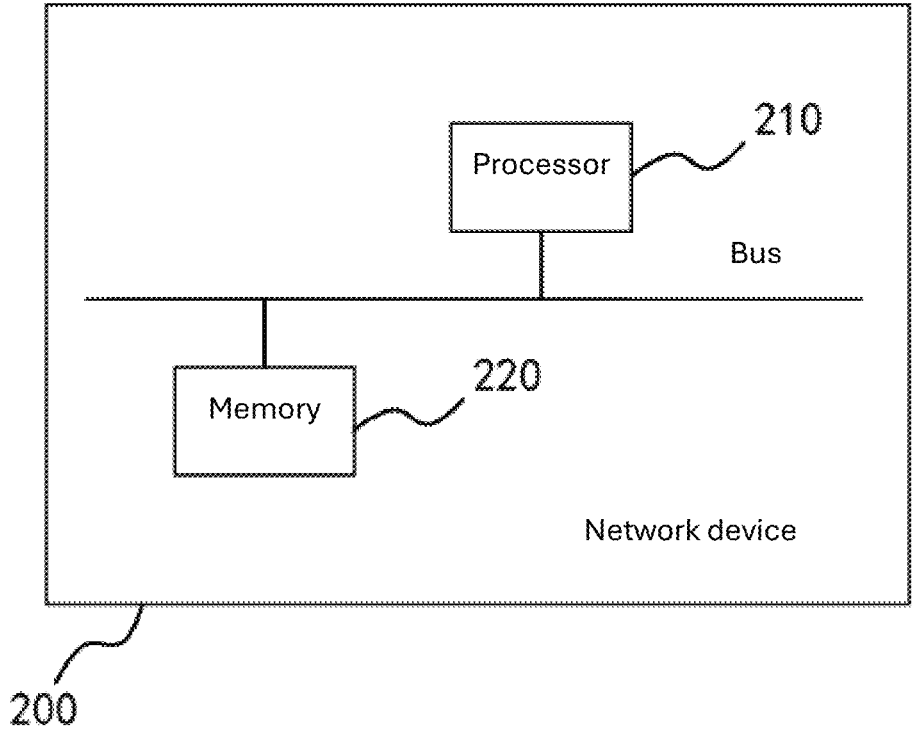
FIG. 36 is a schematic structural diagram of a network device according to an embodiment of the present disclosure.

FIG. 36 is a schematic structural diagram of a network device according to an embodiment of the present disclosure. An embodiment of the present disclosure discloses a network device 200, including: a memory 220, a processor 210, and a computer program stored in the memory 220 and executable by the processor 210. The computer program, when executed by the processor 210, causes the processor 210 to implement the information processing method according to any one of the above embodiments.

The memory 220, as a non-transitory computer-readable storage medium, may be configured for storing a non-transitory software program and a non-transitory computer-executable program. In addition, the memory 220 may include a high-speed random access memory, and may also include a non-transitory memory, e.g., at least one magnetic disk storage device, flash memory device, or other non-transitory solid-state storage device. In some implementations, the memory 220 may include memories located remotely from the processor, and the remote memories may be connected to the processor 210 via a network. Examples of the network include, but are not limited to, the Internet, an intranet, a local area network, a mobile communication network, and combinations thereof.

The network 200 in this embodiment may correspond to the BIER observation point or collector in the implementation environments in the embodiments shown in FIG. 1 to FIG. 3. The two embodiments belong to the same inventive concept and therefore have the same implementation principle and technical effects, so the details will not be repeated here.

The non-transitory software program and instructions required to implement the information processing method of the foregoing embodiments are stored in the memory 220 which, when executed by the processor 210, cause the processor 210 to implement the information processing method of the foregoing embodiments, for example, implement the method steps in FIG. 4 to FIG. 7, in FIG. 10 to FIG. 20, in FIG. 22 to FIG. 27, or in FIG. 32 to FIG. 35.

It should be noted that for specific implementations and technical effects of the network device 200 according to the embodiments of the present disclosure, reference may be made to the specific implementations and technical effects of the information processing method.

In addition, an embodiment of the present disclosure discloses a computer-readable storage medium, storing computer-executable instructions which, when executed by a processor, causes the processor to implement the information processing method according to any one of the above embodiments.

In addition, an embodiment of the present disclosure discloses a computer program product, including a computer program or computer instructions stored in a computer-readable storage medium which, when read from the computer-readable storage medium and executed by a processor of a computer device, causes the computer device to implement the information processing method according to any one of the above embodiments.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an electrically erasable programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

What is claimed is:

1. An information processing method, comprising:
receiving a Bit Index Explicit Replication (BIER) flow flowing through a current node; and
collecting statistics on the BIER flow to obtain node statistics information of the BIER flow.

2. The information processing method of claim 1, wherein after receiving a BIER flow flowing through a current node, the method further comprises:
determining a target BIER flow to be counted from the received BIER flow according to packet information of the BIER flow and a preset statistical rule, to collect statistics on the target BIER flow.

3. The information processing method of claim 2, wherein the preset statistical rule is obtained by any one of the following manners that:
the preset statistical rule is obtained according to configuration information of the current node;
the preset statistical rule is obtained by extending a YANG model to the current node; and
the preset statistical rule is obtained by extending a Border Gateway Protocol-Link State (BGP-LS) to the current node.

4. The information processing method of claim 3, wherein the node statistics information comprises at least one of:
a number of received packets of the BIER flow, a number of received bytes of the BIER flow, an egress interface for sending the BIER flow, a number of sent packets of the BIER flow, a number of sent bytes of the BIER flow, a number of dropped packets of the BIER flow, a number of dropped bytes of the BIER flow, a timestamp at which the BIER flow arrives at the current node, and a timestamp at which the BIER flow leaves the current node.

5. The information processing method of claim 3, further comprising one of:
determining a current network state according to the node statistics information; and
generating encoding information corresponding to the node statistics information, and sending the node statistics information and the encoding information to a collector, such that the collector determines a current network state according to the node statistics information and the encoding information.

6. The information processing method of claim 2, wherein the preset statistical rule is based on any one of: encapsulation type information, Bit String Length (BSL) information, Sub-Domain (SD) information, Traffic Class (TC) information, Differentiated Services Code Point (DSCP) information, BIT-Forwarding Ingress Router (BFIR) device identity information, BIT-Forwarding Egress Router (BFER) device identity information, a preset traffic element, a source address, a destination address, a source port number, and a destination port number.

7. The information processing method of claim 6, wherein the node statistics information comprises at least one of:
a number of received packets of the BIER flow, a number of received bytes of the BIER flow, an egress interface for sending the BIER flow, a number of sent packets of the BIER flow, a number of sent bytes of the BIER flow, a number of dropped packets of the BIER flow, a number of dropped bytes of the BIER flow, a timestamp at which the BIER flow arrives at the current node, and a timestamp at which the BIER flow leaves the current node.

8. The information processing method of claim 2, wherein the node statistics information comprises at least one of:
a number of received packets of the BIER flow, a number of received bytes of the BIER flow, an egress interface for sending the BIER flow, a number of sent packets of the BIER flow, a number of sent bytes of the BIER flow, a number of dropped packets of the BIER flow, a number of dropped bytes of the BIER flow, a timestamp at which the BIER flow arrives at the current node, and a timestamp at which the BIER flow leaves the current node.

9. The information processing method of claim 2, further comprising one of:
determining a current network state according to the node statistics information; and
generating encoding information corresponding to the node statistics information, and sending the node statistics information and the encoding information to a collector, such that the collector determines a current network state according to the node statistics information and the encoding information.

10. The information processing method of any one of claims claim 1, wherein the node statistics information comprises at least one of:
a number of received packets of the BIER flow, a number of received bytes of the BIER flow, an egress interface for sending the BIER flow, a number of sent packets of the BIER flow, a number of sent bytes of the BIER flow, a number of dropped packets of the BIER flow, a number of dropped bytes of the BIER flow, a timestamp at which the BIER flow arrives at the current node, and a timestamp at which the BIER flow leaves the current node.

11. The information processing method of any one of claims claim 1, further comprising one of:
determining a current network state according to the node statistics information; and
generating encoding information corresponding to the node statistics information, and sending the node statistics information and the encoding information to a collector, such that the collector determines a current network state according to the node statistics information and the encoding information.

12. A network device, comprising: a memory, a processor, and a computer program stored in the memory and executable by the processor, wherein the computer program, when executed by the processor, causes the processor to perform the information processing method of claims 1.

13. A non-transitory computer-readable storage medium, storing computer-executable instructions which, when executed by a processor, cause the processor to perform the information processing method of claims 1.

14. A computer program product, comprising a computer program or computer instructions stored in a non-transitory computer-readable storage medium, the computer program or computer instructions, when read from the non-transitory computer-readable storage medium and executed by a processor of a computer device, causes the computer device to perform the information processing method of claim 1.

15. An information processing method, comprising:

acquiring node statistics information of a Bit Index Explicit Replication (BIER) flow and encoding information corresponding to the node statistics information; and determining a current network state according to the node statistics information and the encoding information.

16. The information processing method of claim 15, wherein the encoding information comprises a template and a data parameter in the template; and determining a current network state according to the node statistics information and the encoding information comprises:

parsing the node statistics information according to a structure of the template and the data parameter to obtain parsing information; and determining the current network state according to the parsing information.

17. The information processing method of claim 15, wherein in response to the node statistics information comprising a timestamp at which the BIER flow arrives at a node and a timestamp at which the BIER flow leaves the node, determining a current network state according to the node statistics information and the encoding information comprises:

parsing the node statistics information according to the encoding information to obtain the timestamp at which the BIER flow arrives at the node and the timestamp at which the BIER flow leaves the node; and determining a transmission time of the BIER flow in a BIER domain according to the timestamp at which the BIER flow arrives at the node and the timestamp at which the BIER flow leaves the node.

18. The information processing method of claim 15, wherein in response to the node statistics information comprising a number of dropped packets of the BIER flow, determining a current network state according to the node statistics information and the encoding information comprises:

parsing the node statistics information according to the encoding information to obtain the number of dropped packets of the BIER flow; and determining a current network load status according to the number of dropped packets of the BIER flow.

19. The information processing method of claim 15, wherein in response to the node statistics information comprising an ingress interface for receiving the BIER flow and an egress interface for sending the BIER flow, determining a current network state according to the node statistics information and the encoding information comprises:

parsing the node statistics information according to the encoding information to obtain the ingress interface for receiving the BIER flow and the egress interface for sending the BIER flow; and determining a current network configuration status according to the ingress interface for receiving the BIER flow and the egress interface for sending the BIER flow.

20. The information processing method of claim 15, wherein in response to the node statistics information comprising a number of packets of the BIER flow and packet information comprising a source address and a destination address, determining a current network state according to the node statistics information and the encoding information comprises:

parsing the node statistics information according to the encoding information to obtain the number of packets of the BIER flow, the source address, and the destination address; and determining a current network attack status according to the number of packets of the BIER flow, the source address, and the destination address.

\* \* \* \* \*